(12) United States Patent
Kawabata et al.

(10) Patent No.: US 6,870,525 B2
(45) Date of Patent: Mar. 22, 2005

(54) LIGHTING UNIT AND LIQUID CRYSTAL DISPLAY DEVICE INCLUDING THE LIGHTING UNIT

(75) Inventors: Masae Kawabata, Matsusaka (JP); Makoto Shiomi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 209 days.

(21) Appl. No.: 10/196,511

(22) Filed: Jul. 17, 2002

(65) Prior Publication Data

US 2003/0016205 A1 Jan. 23, 2003

(30) Foreign Application Priority Data

Jul. 19, 2001 (JP) ........................................ 2001-219224

(51) Int. Cl.[7] .............................................. G09G 3/36
(52) U.S. Cl. ............................ 345/102; 345/87; 349/61
(58) Field of Search ............................. 345/87, 89, 94, 345/95, 99, 100, 102, 204; 349/61

(56) References Cited

U.S. PATENT DOCUMENTS

| | | | | |
|---|---|---|---|---|
| 4,907,862 A | * | 3/1990 | Suntola ........................ | 349/61 |
| 5,093,652 A | * | 3/1992 | Bull et al. ................... | 345/592 |
| 5,122,791 A | * | 6/1992 | Gibbons et al. ............. | 345/102 |
| 5,387,921 A | * | 2/1995 | Zhang et al. ................ | 345/102 |
| 5,402,143 A | * | 3/1995 | Ge et al. ..................... | 345/102 |
| 5,416,496 A | * | 5/1995 | Wood .......................... | 345/102 |
| 5,461,397 A | * | 10/1995 | Zhang et al. ................ | 345/102 |
| 5,796,382 A | * | 8/1998 | Beeteson .................... | 345/102 |
| 2002/0008694 A1 | | 1/2002 | Miyachi et al. | |

FOREIGN PATENT DOCUMENTS

| | | |
|---|---|---|
| JP | 64-082019 | 3/1989 |
| JP | 11-202285 | 7/1999 |
| JP | 11-202286 | 7/1999 |
| JP | 2000-275604 | 10/2000 |

OTHER PUBLICATIONS

Korean Office Action dated Jun. 29, 2004 (w/partial English translation thereof).
U. S. Appl. No. Miyachi et al; 09/878,358; filed Jun. 12, 2001, Publication No. 2002/0008694 A1.

* cited by examiner

Primary Examiner—Regina Liang
(74) Attorney, Agent, or Firm—Nixon & Vanderhye P.C.

(57) ABSTRACT

A lighting unit includes a reflector, a plurality of light-emitting elements and a controller. The light-emitting elements are respectively provided on the reflector for a plurality of light-emitting regions. The controller supplies a periodic drive signal to each of the light-emitting elements, thereby defining a state of the light-emitting element. The lighting unit illuminates a display panel including a light modulating layer with light that has been emitted from the light-emitting elements. The controller supplies drive signals of substantially different types to at least two of the light-emitting elements.

10 Claims, 24 Drawing Sheets

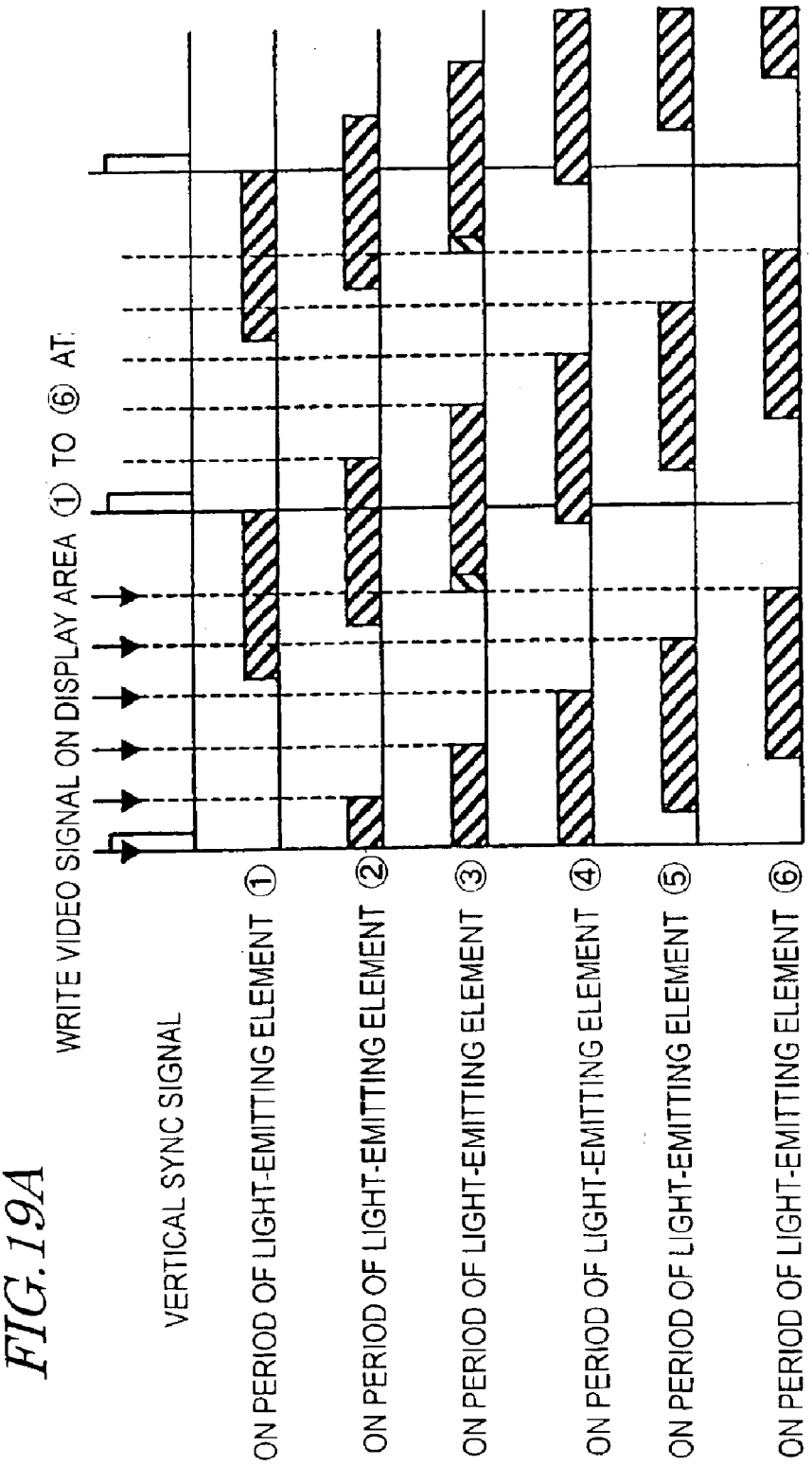

LIGHTING UNIT AND LIQUID CRYSTAL DISPLAY DEVICE INCLUDING THE LIGHTING UNIT

BACKGROUND OF THE INVENTION

1. Field of the Invention

The present invention relates to a lighting unit for use as a backlight in a liquid crystal display device, for example, and also relates to a liquid crystal display device that uses the lighting unit.

2. Description of the Related Art

A liquid crystal display device has a number of advantageous features including light weight, reduced thickness and low power consumption. Thus, a liquid crystal display device is now used extensively in office automation appliances, car mount TV sets, camcorder monitors and so on. However, when a motion picture is displayed at a high rate on a liquid crystal display device, the resultant quality of the image displayed might deteriorate. For example, the image once displayed thereon might lag or smear due to the low response of its liquid crystal molecules to an applied voltage.

According to a known technique, a quality motion picture may be displayed on a transmission type liquid crystal display device by getting the screen illuminated intermittently with the light from a backlight. In this technique, only while the backlight is ON, the viewer senses an image instantaneously. In this manner, the afterimage remaining in the human eyes can be controlled appropriately. Thus, compared to keeping the backlight ON continuously, a motion picture of better quality can be displayed.

Liquid crystal display devices of the type turning the backlight ON only during a predetermined period are disclosed in Japanese Laid-Open Publications Nos. 1-082019, 11-202285 and 11-202286, for example. In the liquid crystal display devices disclosed in Japanese Laid-Open Publications Nos. 11-202285 and 11-202286, the backlight (or the lighting unit) thereof includes a plurality of light-emitting regions that are arranged in the vertical scanning direction of the liquid crystal panel thereof (i.e., the direction in which multiple gate lines are driven sequentially). Light-emitting elements provided for those light-emitting regions are sequentially turned ON and OFF synchronously with the input of a vertical sync signal to the liquid crystal panel. By sequentially lighting one of these light-emitting regions after another in the vertical scanning direction (i.e., scan lighting), an image is displayed only during a predetermined period at each pixel while the liquid crystal layer is responding. As a result, a quality motion picture may be displayed.

FIGS. 24A and 24B illustrate an exemplary configuration for a conventional backlight for use to carry out the scan lighting. As shown in FIG. 24B, the backlight 900 includes a reflector 90, a diffuser 92 and a plurality of light-emitting elements 94 that are arranged between the reflector 90 and the diffuser 92. These light-emitting elements 94 may be driven independently. By controlling and sequentially turning ON and OFF one of these light-emitting elements 94 after another, light may be emitted from one predetermined region on the diffuser 92 after another.

Although not shown in FIGS. 24A and 24B, the backlight 900 may further include partitions. Each of the partitions is used to separate two adjacent ones of the light-emitting elements 94 from each other. When such partitions are provided for the backlight 900, most of the light emitted from each light-emitting element 94 is directed toward an associated region on the diffuser 92 (i.e., its associated light-emitting region) as defined by the partitions. Thus, the luminous efficacy of a predetermined light-emitting region can be increased compared to providing no such partitions. In this manner, a desired emission intensity is realized for each light-emitting region and yet each light-emitting element may be turned ON for a substantially short time (i.e., at a short pulse width). As a result, even better display quality is achievable in displaying a motion picture at a high rate.

In the arrangement including those partitions to divide the light-emitting plane of the backlight into a plurality of light-emitting regions, it is possible to substantially prevent a light-emitting region illuminated by one light-emitting element from being affected by the light emitted from an adjacent light-emitting element. Thus, each light-emitting region can be illuminated at a sufficiently short pulse width.

However, where the light-emitting plane is divided by those partitions into a plurality of light-emitting regions, the emission intensity of one of the light-emitting regions may be different from that of another. In that case, the difference in luminance may be noticeable to the human eyes very easily. When those partitions are provided, a light-emitting region illuminated by one light-emitting element may be affected by the light emitted from an adjacent light-emitting element to a much lesser degree. But it is very difficult to completely eliminate the adverse effects of the adjacent light-emitting element on the light-emitting region. That is to say, each light-emitting region is inevitably affected by a neighboring light-emitting element to a certain degree. Also, as for the two outer light-emitting regions of the lighting unit, no light-emitting element exists on one side and light is incident thereon from only one direction. Thus, compared to the other regions, these light-emitting regions have decreased emission intensity. As a result, portions of an image displayed on both ends of the display panel look darker than the other portions of the image.

Furthermore, even if the adverse effects of the adjacent light-emitting element could be eliminated completely, the light-emitting elements still might have mutually different emission characteristics. Then, the difference in luminance would be very sensible. A problem like this may also arise in a lighting unit including no partitions between the light-emitting elements. For example, even if just one of the light-emitting elements has had its luminance decreased for some reason, a similar variation in luminance will be perceivable to the viewer.

SUMMARY OF THE INVENTION

In order to overcome the problems described above, preferred embodiments of the present invention provide a lighting unit that causes a drastically reduced luminance variation and also provide a liquid crystal display device that realizes significantly improved display quality by using the lighting unit.

A lighting unit according to a preferred embodiment of the present invention includes: a reflector; a plurality of light-emitting elements, which are respectively provided on the reflector for a plurality of light-emitting regions; and a controller for supplying a periodic drive signal to each of the light-emitting elements, thereby defining a state of the light-emitting element. The lighting unit illuminates a display panel including a light modulating layer with light that has been emitted from the light-emitting elements. The controller supplies drive signals of substantially different types to at least two of the light-emitting elements.

In one preferred embodiment of the present invention, the lighting unit preferably further includes at least one partition on the reflector so that the light-emitting regions are defined by the at least one partition.

A lighting unit according to another preferred embodiment of the present invention includes: a reflector; at least one partition, which is provided on the reflector to define a plurality of light-emitting regions; a plurality of light-emitting elements, which are respectively provided on the reflector for the light-emitting regions; a controller for supplying a drive signal to each of the light-emitting elements, thereby defining a state of the light-emitting element; and a plurality of detectors, which are respectively provided for the light-emitting regions to detect luminances of the light-emitting regions.

In one preferred embodiment of the present invention, the controller preferably changes the drive signals to be supplied to the light-emitting elements in accordance with outputs of the detectors.

In another preferred embodiment of the present invention, the controller preferably supplies a drive signal, having first and second signal intensities within one period, to each of the light-emitting elements. The light-emitting element is preferably controlled to change into a first state responsive to the drive signal having the first signal intensity and into a second state responsive to the drive signal having the second signal intensity, respectively. The second state preferably has an emission intensity lower than that of the first state.

In this particular preferred embodiment, the controller preferably controls the light-emitting elements to the first or second state at mutually different points of times.

Specifically, the second state may be a zero-luminance state.

Alternatively, the second state may be a reduced-luminance state.

In still another preferred embodiment, the controller preferably supplies drive signals, which have the first signal intensity for mutually different percentages of the one period thereof, to at least two of the light-emitting elements, respectively.

In yet another preferred embodiment, the controller preferably supplies drive signals, having mutually different maximum signal intensities, to at least two of the light-emitting elements, respectively.

In yet another preferred embodiment, the at least one partition is preferably elongated in a predetermined direction.

A liquid crystal display device according to still another preferred embodiment of the present invention includes: a liquid crystal panel that includes a pair of substrates and a liquid crystal layer sandwiched between the substrates; and the lighting unit according to any of the preferred embodiments of the present invention described above. The lighting unit is provided behind the liquid crystal panel. Multiple gate lines are arranged substantially parallelly to each other on one of the two substrates. A direction in which the gate lines extend is substantially parallel to a direction in which the at least one partition extends.

In the lighting unit according to preferred embodiments of the present invention, the light-emitting elements are respectively provided for the light-emitting regions, and the controller supplies drive signals of substantially different types to at least two of these light-emitting elements, thereby controlling the emission intensities of the light-emitting elements to mutually different levels. As already described for the background of the invention, even if the light-emitting elements have the same emission intensity, the light-emitting regions may have mutually different luminance values. This is because a light-emitting region illuminated by one of the light-emitting elements may be affected by the light emitted from an adjacent one of the light-emitting elements. Even so, if the emission states of the light-emitting regions are controllable independently by varying the emission intensities of the light-emitting elements intentionally, the luminances of the light-emitting regions can be substantially equalized with each other. As a result, the lighting unit as a whole can emit light having a uniform luminance without causing the unwanted variation in luminance. Accordingly, a liquid crystal display device including a lighting unit like this can display a motion picture at a desired high rate.

As used herein, the "drive signals of substantially different types" do include signals having mutually different waveforms or amplitudes but do not include signals having the same waveform, the same amplitude and mutually different phases. Also, when the "drive signals of substantially different types" are supplied to the same light-emitting element, the light-emitting element will emit light in respective quantities or at respective intensities that are significantly different from each other due to the difference in waveform or amplitude between the drive signals. It should be noted that the "quantity of light" herein means a quantity of light emitted in a period of time that is sufficiently longer than one period of the drive signals and that the "emission intensity" herein means an average of the quantity of light per unit time. Furthermore, the "drive signal" may also be either a voltage or a current itself that is applied to a light-emitting element and changes its level or amount with time. For example, when a light-emitting element is turned ON and OFF by applying a voltage having a predetermined level thereto intermittently, the "drive signal" may mean a voltage that changes its level between the predetermined level and zero with time.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 19A is a timing diagram showing timing relationships between the video signal and the ON and OFF periods of the light-emitting elements for the lighting unit including the reflector III.

DETAILED DESCRIPTION OF PREFERRED EMBODIMENTS

Embodiment 1

Figure 1A:
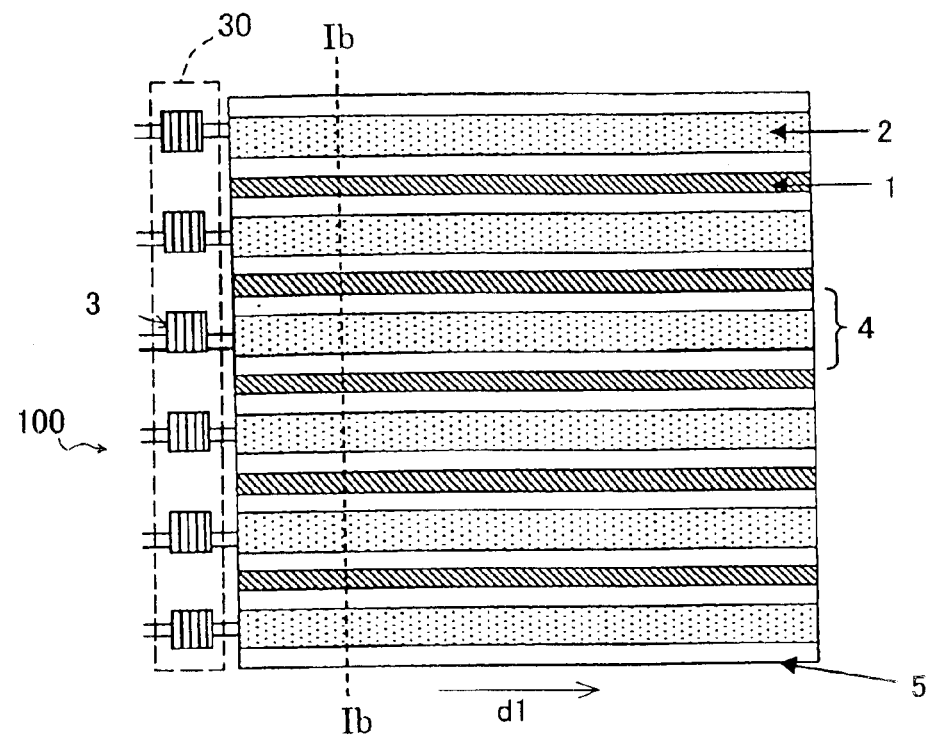
FIGS. 1A and 1B are respectively a plan view and a cross-sectional view, taken along the line Ib—Ib shown in FIG. 1A, of a lighting unit according to a first specific preferred embodiment of the present invention.

Hereinafter, a lighting unit according to a first specific preferred embodiment of the present invention will be described with reference to FIGS. 1 through 19B. In FIGS. 1 through 19B, any member illustrated in multiple drawings but having substantially the same function will be identified by the same reference numeral.

Figure 1B:
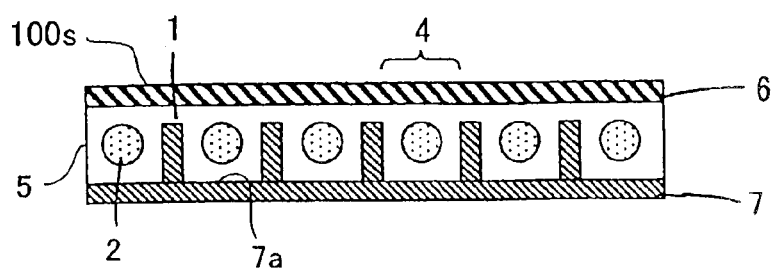

FIGS. 1A and 1B are respectively a plan view of a lighting unit 100 according to the first preferred embodiment and a cross-sectional view thereof taken along the line Ib-Ib shown in FIG. 1A. The lighting unit 100 may have approximate dimensions of 32 cm (vertically)×40. 5 cm (horizontally)×2.5 cm (thickness). As shown in FIGS. 1A and 1B, the lighting unit 100 includes a reflector 7 with a reflective plane 7a, a diffuser 6 that faces the reflective plane 7a of the reflector 7, and a plurality of light-emitting elements 2 interposed between the reflector 7 and the diffuser 6. These members 2, 6 and 7 are stored inside a casing 5.

A number of partitions 1, which extend in a predetermined direction d1, are provided on the reflective plane 7a of the reflector 7. These partitions 1 define a plurality of light-emitting regions 4 on the light-emitting plane 100S of the lighting unit 100. The partitions 1 and the reflector 7 may be made of the same material (e.g., polycarbonate (PC), acrylonitrile butadiene styrene (ABS) or any other suitable plastic material). In that case, the partitions 1 may form integral parts of the reflector 7. Alternatively, the partitions 1 and the reflector 7 may be made of mutually different materials and then assembled together. It should be noted that the partitions 1 do not have to be secured to the reflector 7. To increase the optical efficiency, the partitions 1 are preferably reflective.

Each of the light-emitting elements 2 is provided between an adjacent pair of partitions 1 and is associated with one of the light-emitting regions 4. In the preferred embodiment illustrated in FIGS. 1A and 1B, one light-emitting element 2 is provided for one light-emitting region 4. Optionally, a plurality of light-emitting elements 2 may be provided for a single light-emitting region 4. A cold-cathode tube may be used as the light-emitting element 2.

Also, as shown in FIG. 1A, the lighting unit 100 further includes a lighting controller 30 that is made up of a plurality of control circuits 3 connected to the respective light-emitting elements 2. The lighting controller 30 controls the emission states of the light-emitting elements 2 independently by supplying drive signals (e.g., currents or voltages) of substantially different types to the respective light-emitting elements 2. It should be noted that as long as the lighting controller 30 can control the emission states of the respective light-emitting elements 2 independently, the lighting controller 30 does not have to be made up of multiple control circuits 3 as shown in FIG. 1A but may be a single controller that is connected to the respective light-emitting elements 2.

It should also be noted that when the partitions 1 are provided between the light-emitting elements 2, a shadow may be cast on a region of the light-emitting plane 100s over each of the partitions 1. However, when the diffuser 6 is provided as is done in this preferred embodiment, the resultant luminance is not so much affected by the shadows projected by the partitions 1.

Figure 2A:
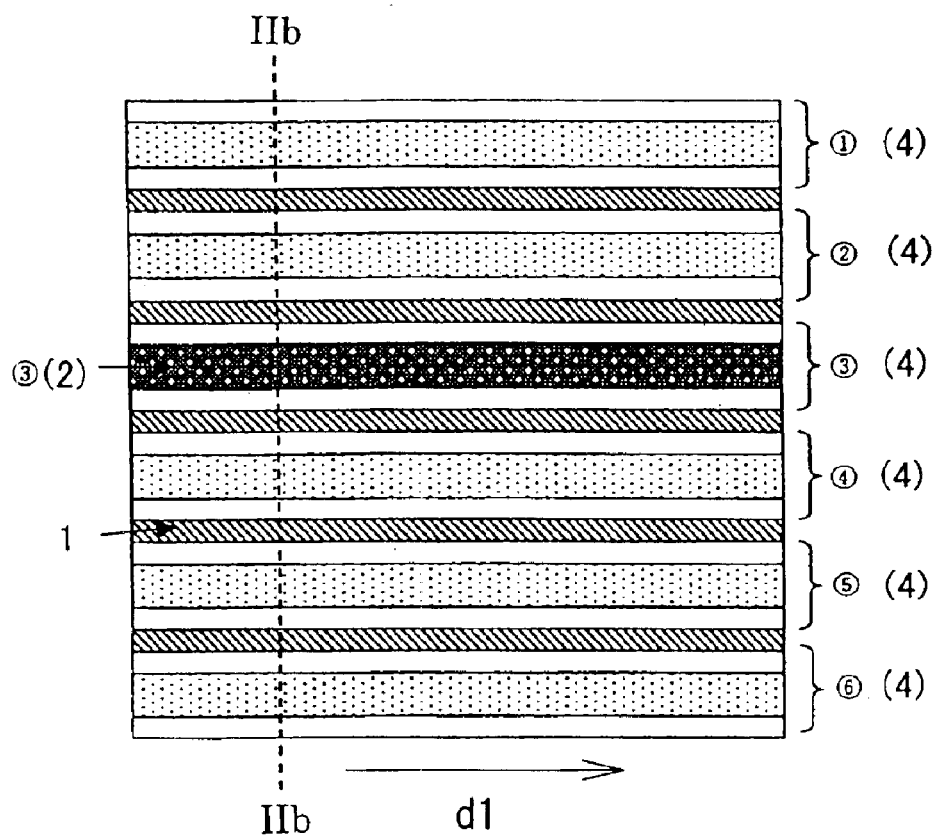
FIG. 2A is a plan view illustrating a lighting unit including a reflector I.
Figure 2B:
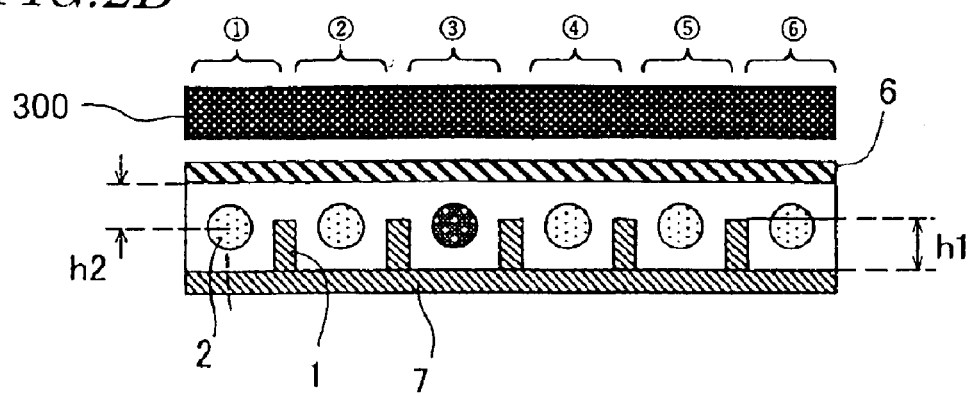
FIG. 2B is a cross-sectional view, taken along the line IIb—IIb shown in FIG. 2A, of a liquid crystal panel including the lighting unit shown in FIG. 2A.

Next, an exemplary application of the lighting unit 100 shown in FIGS. 1A and 1B to a liquid crystal panel 300 including a liquid crystal layer as its light modulating layer will be described with reference to FIGS. 2A and 2B. In the preferred embodiment shown in FIGS. 2A and 2B, the reflector 7 of the lighting unit 100 includes the partitions 1 having a height h1 of about 6 mm, and the distance h2 between the center of the light-emitting elements 2 and the diffuser 6 is about 17 mm. The reflector 7 shown in FIG. 2B will be also referred to as a "reflector I" for convenience sake. A cold-cathode tube is used as each of the light-emitting elements 2.

Figure 3:
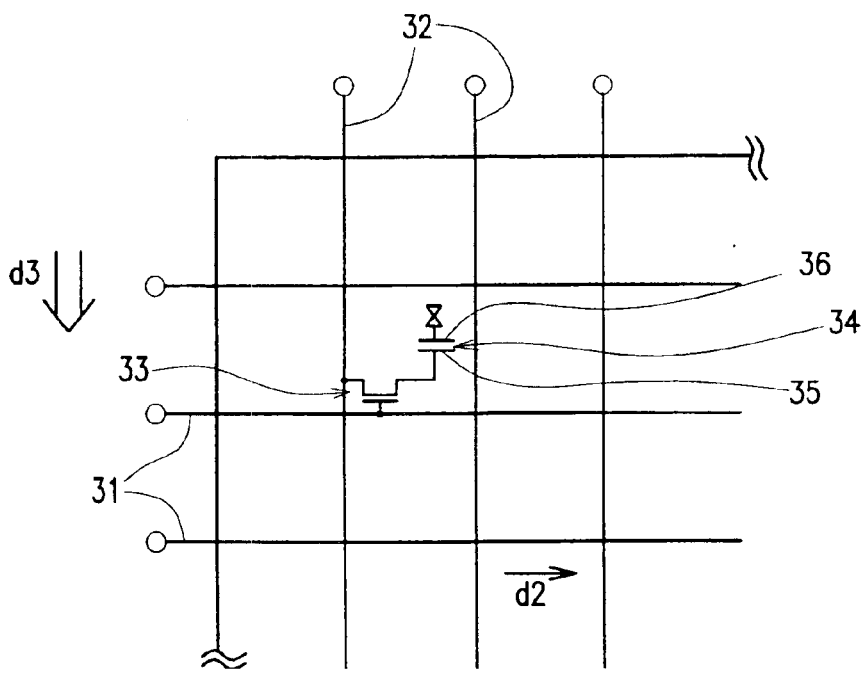
FIG. 3 is a circuit diagram illustrating a configuration for the liquid crystal panel shown in FIG. 2B.

FIG. 3 shows a configuration for the liquid crystal panel 300. As shown in FIG. 3, the liquid crystal panel 300 includes a plurality of (e.g., 480) gate lines 31 that are arranged substantially parallelly to each other and a plurality of (e.g., 600) data lines 32 that are arranged so as to intersect with the gate lines 31. A switching element 33 such as a thin-film transistor (TFT) is provided near, and connected to, each of the intersections between the gate lines 31 and the data lines 32. The switching element 33 is also connected to a pixel electrode 35 for use to apply a voltage to the liquid crystal layer 34. FIG. 3 shows a portion of the liquid crystal panel 300 to a larger scale so that the width of one of the light-emitting regions 4 shown in FIGS. 2A and 2B corresponds to the combined width of a great number of (e.g., 80) gate lines 31.

In this liquid crystal panel 300, when the switching element 33 is turned ON responsive to a scanning pulse signal supplied through one of the gate lines 31, a predetermined voltage signal is supplied to the pixel electrode 35 by way of associated one of the data lines 32. In this manner, a voltage applied to the liquid crystal layer 34, which is interposed between the pixel electrode 35 and a counter electrode 36, is controlled to display an image on the liquid crystal panel 300.

When the lighting unit 100 is used for such a liquid crystal panel 300, the lighting unit 100 and the liquid crystal panel 300 are disposed so that the direction d1 in which the partitions 1 extend in the lighting unit 100 (see FIG. 2A) corresponds to the direction d2 in which the gate lines 31 extend in the liquid crystal panel 300. The gate lines 31 are sequentially scanned at predetermined intervals in the direction indicated by the arrow d3 in FIG. 3 (which direction will be herein referred to as a "vertical scanning direction"). However, the direction d1 in which the partitions 1 extend crosses the vertical scanning direction d3 at right angles. Thus, the light-emitting regions 4 of the lighting unit 100 are arranged in the vertical scanning direction d3 of the liquid crystal panel 300. Accordingly, as the pixels of the liquid crystal panel 300 are sequentially rewritten in the vertical scanning direction d3, light can be emitted from one of the light-emitting regions 4 of the lighting unit 100 after another.

Referring back to FIGS. 2A and 2B, most of the light emitted from the light-emitting element 2 for one of the light-emitting regions 4 is used to illuminate its associated region 4 due to the presence of the partitions 1 but may have some effect on its neighboring light-emitting regions 4.

Figure 4:
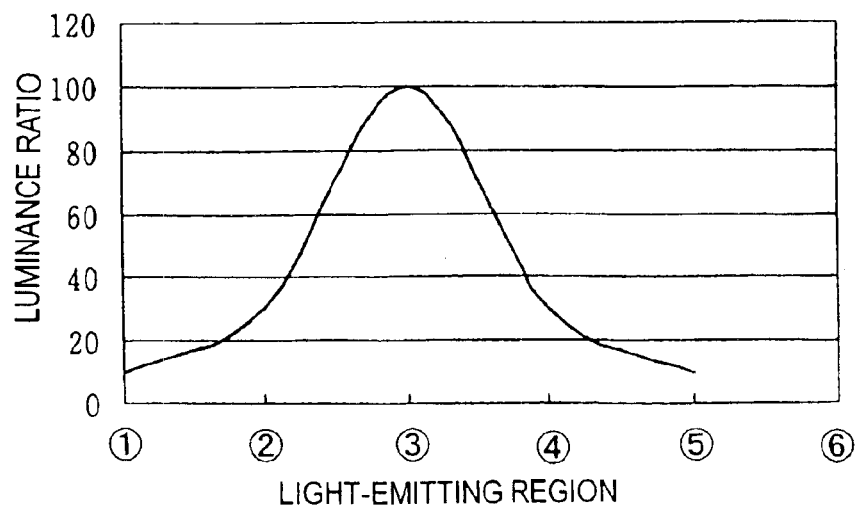
FIG. 4 is a graph showing how one light-emitting element associated with one light-emitting region may affect the other light-emitting regions when the reflector I is used.

FIG. 4 is a graph showing how a predetermined light-emitting element 2 (in this case, the light-emitting element (or cold-cathode tube) ③ associated with the light-emitting region ③) affected light-emitting regions other than its associated light-emitting region ③. The results shown in FIG. 4 were obtained by using the reflector I and measured with a luminance meter. As shown in FIG. 4, supposing the maximum luminance of the light-emitting region ③ associated with the ON-state light-emitting element ③ was 100%, the luminances of the two directly neighboring light-emitting regions ② and ④ thereof were about 30%, those of the two light-emitting regions ① and ⑤ adjacent to the regions ② and ④ were about 10% and that of the light-emitting region ⑥ outside of the region ⑤ was within an error range.

In an illustrative example to be described below, the lighting unit 100 in which the reflector I is used, the six light-emitting elements 2 that are numbered from ① through ⑥ downward are arranged, and the six light-emitting regions 4 (also numbered from ① through ⑥) are defined on the light-emitting plane, is combined with the liquid crystal panel 300. In this example, the lighting controller 30 is so constructed as to sequentially turn ON and OFF the respective light-emitting elements 2 synchronously with the input of the vertical sync signal to the liquid crystal panel 300. A drive signal (i.e., a voltage signal or a current signal) to be supplied to each of the light-emitting elements is a periodic signal, of which one period is as long as one vertical scanning period of the liquid crystal panel 300.

Figure 5:
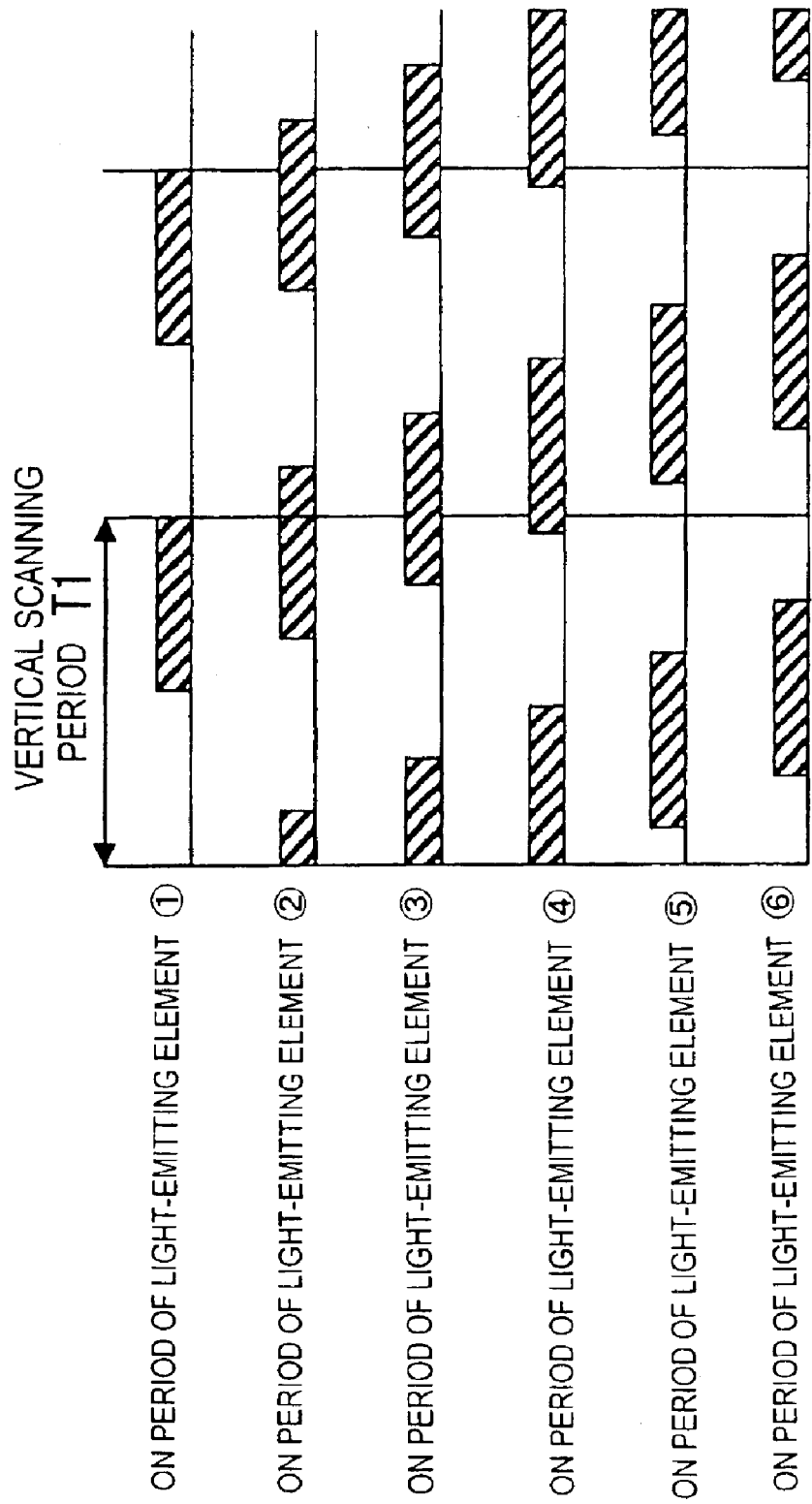
FIG. 5 is a timing diagram showing when the respective light-emitting elements may be turned ON and OFF where the reflector I is used.

For example, each of the light-emitting elements (or cold-cathode tubes) 2 may be turned ON in 50% of one vertical scanning period T1 and turned OFF in the remaining 50% of the period T1 as shown in FIG. 5, thereby getting light emitted from one of the light-emitting elements 2 after another at mutually different points of times (or at regular intervals). In this manner, so-called "scan lighting" is carried out. Then, the controller 30 may supply a drive signal, which has a first signal intensity high enough to turn each of the light-emitting elements 2 ON in 50% of one period thereof and a second signal intensity low enough to turn the light-emitting element 2 OFF in the remaining 50% of the one period, to one of the light-emitting elements 2 after another at different points of times. In this case, the drive signal supplied to one of the light-emitting elements 2 should have its phase shifted from that of the drive signal supplied to adjacent one of the light-emitting elements 2. The first signal intensity corresponds to the maximum voltage or current value, while the second signal intensity corresponds to a zero voltage or current value. It should be noted that each light-emitting element 2 should start to emit light synchronously with the input of a video signal to a predetermined display area of the liquid crystal panel 300 that is associated with the light-emitting region 4 of the light-emitting element 2. Each predetermined display area of the liquid crystal panel 300 includes the same number of gate lines (e.g., 80 gate lines in this specific example). Thus, the "timing at which the video signal starts to be input to the predetermined display area" herein means a point in time at which a scanning pulse signal is input to the first one of the gate lines included in that predetermined display area and the video signal starts to be input to the pixels that are connected to the first gate line.

Figure 6:
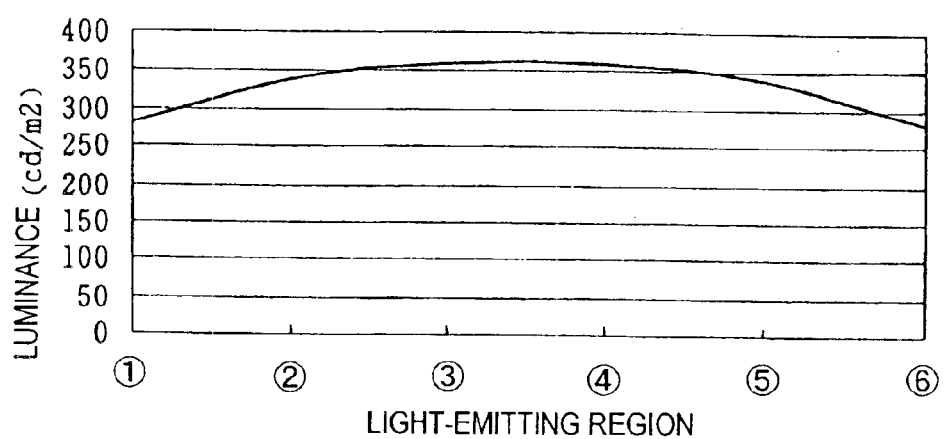
FIG. 6 is a graph showing the resultant luminance values of the respective light-emitting regions for the lighting unit including the reflector I.

In this specific example, the luminances of the respective light-emitting regions ①  through ⑥ measured as shown in FIG. 6: the two innermost light-emitting regions ③ and ④ had a luminance value of 360 cd/m²; the two directly neighboring light-emitting regions ② and ⑤ had a luminance value of 340 cd/m²; and the other two outermost light-emitting regions ① and ⑥ had a luminance value of 280 cd/m². That is to say, the respective light-emitting regions ①, ②, ③, ④, ⑤ and ⑥ had luminance values of 280 cd/m², 340 cd/m², 360 cd/m², 360 cd/m², 340 cd/m² and 280 cd/m², respectively.

The results shown in FIG. 6 correspond with those shown in FIG. 4. That is to say, supposing the maximum luminance of one light-emitting region 4 associated with an ON-state light-emitting element 2 is 100%, the luminances of the two directly neighboring light-emitting regions 4 thereof are about 30% and those of the two light-emitting regions 4 adjacent to the directly neighboring regions 4 are about 10%.

Figure 7:
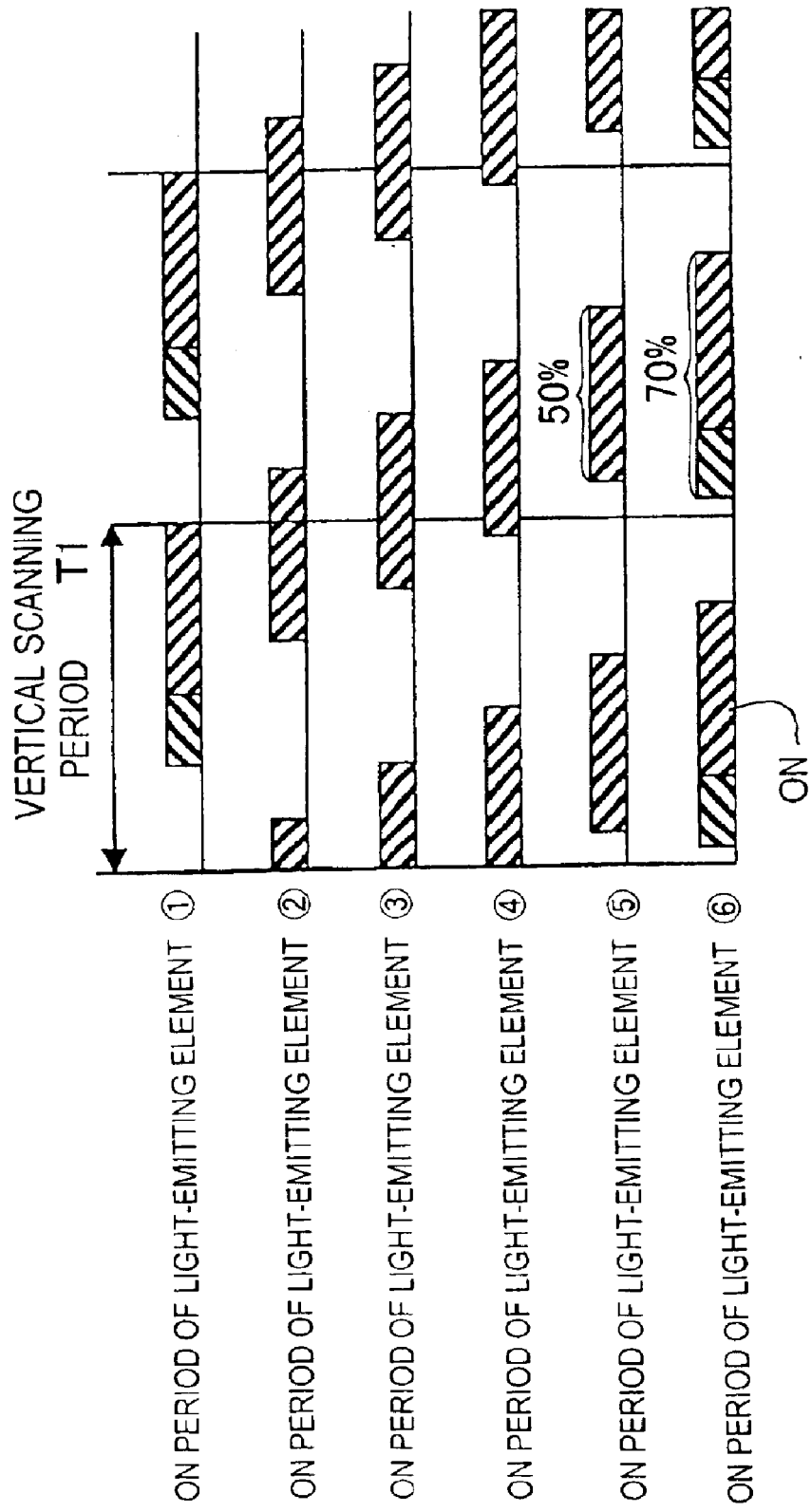
FIG. 7 is a timing diagram showing how the ON period percentages of the respective light-emitting elements may be adjusted to reduce a variation in luminance where the reflector I is used.

To reduce such a variation in luminance, some of the light-emitting elements 2 for some of the light-emitting regions 4 may be turned ON in a different percentage of one vertical scanning period from that of the other light-emitting elements 2 for the other light-emitting regions 4. In this specific example, the light-emitting elements for the two outermost light-emitting regions ① and ⑥ are turned ON in 70% of one vertical scanning period while the light-emitting elements for the other light-emitting regions ②, ③, ④ and ⑤ are turned ON in 50% of one vertical scanning period as shown in FIG. 7. That is to say, in the controller 30, the control circuits 3 for the light-emitting elements of the light-emitting regions ① and ⑥ should supply a drive signal, which is in ON state in 70% of one period, to the two light-emitting elements. On the other hand, the control circuits 3 for the light-emitting elements of the light-emitting regions ②, ③, ④ and ⑤ should supply a drive signal, which is in ON state in 50% of one period, to the four light-emitting elements.

As a result, the luminances of the light-emitting regions ① through ⑥ could be substantially equalized with each other to approximately 360 cd/m². Thus, a lighting unit causing substantially no luminance variation as a whole was realized. And when such a lighting unit was combined with a liquid crystal panel, a quality motion picture could be displayed at a desired high rate.

A quality motion picture can be displayed at a high rate in the following manner. Specifically, when the six light-emitting elements 2 are used and each turned ON in 50% of one vertical scanning period, the effective scanning period of one vertical scanning period is preferably equally divided by six to determine the timings to turn ON and OFF the light-emitting elements 2 as follows. It should be noted that the "effective scanning period" is obtained by subtracting a vertical retrace interval (i.e., a time it takes for a scanning electron beam to return from the lower right corner of an image to the upper left corner thereof after each vertical sweep) from one vertical scanning period.

Figure 8:
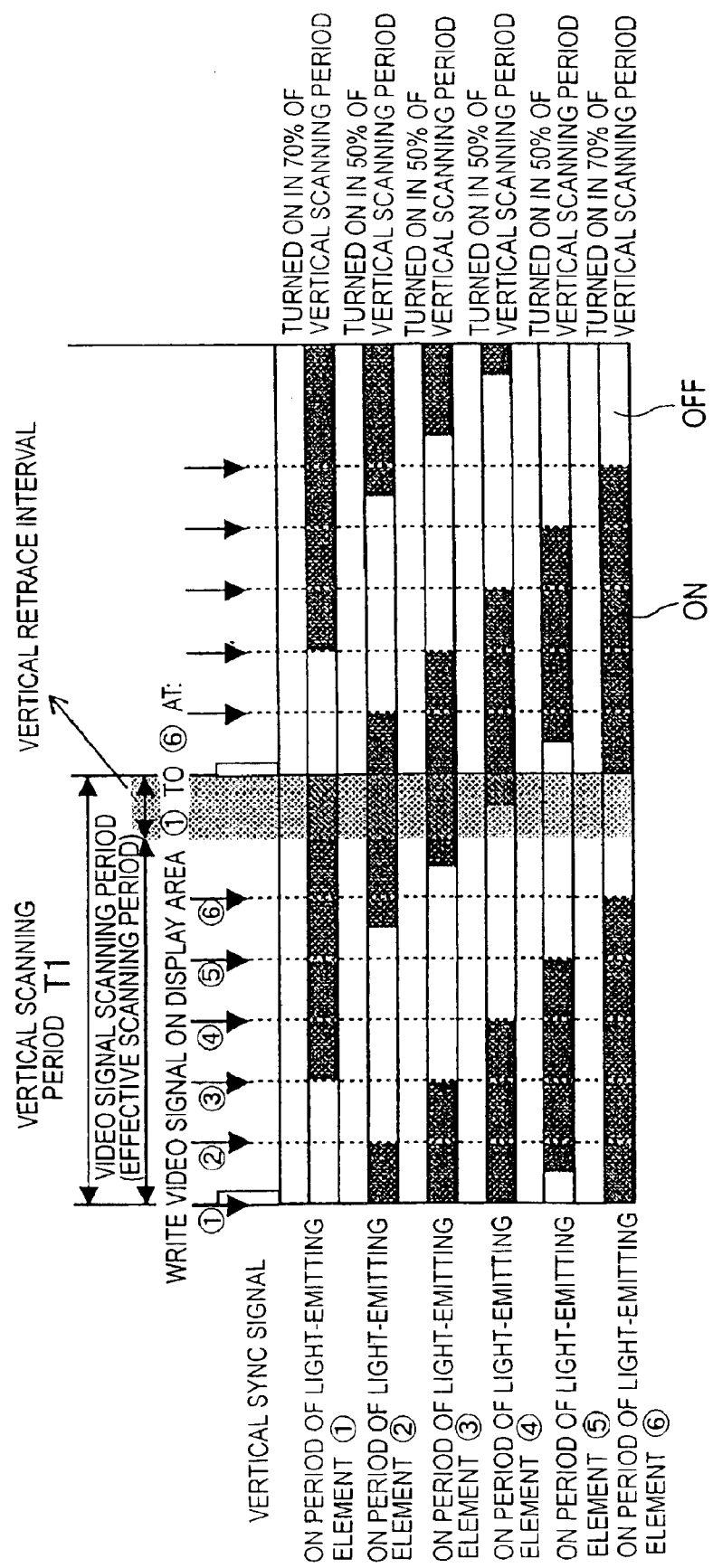
FIG. 8 is a timing diagram showing timing relationships between the video signal and the ON and OFF periods of the light-emitting elements for the lighting unit including the reflector I.

As shown in FIG. 8, the instant a vertical sync signal is input to the liquid crystal panel 300 and a video signal starts to be input to a display area associated with the light-emitting region ① (which display area will be herein referred to as a "display area ①") the light-emitting element ① is turned OFF. The light-emitting element ① is kept OFF while the liquid crystal molecules are responding. However, once 30% of one vertical scanning period has passed, the light-emitting element ① will be ON for the remaining 70% of the vertical scanning period. Next, the instant a video signal starts to be input to a display area ② associated with the light-emitting region ②, the light-emitting element ② is turned OFF. The light-emitting element ② is kept OFF while the liquid crystal molecules are responding. However, once 50% of one vertical scanning period has passed, the light-emitting element ② will be ON for the remaining 50% of the vertical scanning period. Similar operations are performed on the next three light-emitting regions ③, ④ and ⑤. Specifically, the instant a video signal starts to be input to a display area ③, ④ or ⑤ associated with the light-emitting region ③, ④ or ⑤, the light-emitting element ③, ④ or ⑤ turned OFF. Once 50% of one vertical scanning period has passed, the light-emitting element ③, ④ or ⑤ will be ON for the remaining 50% of the vertical scanning period. As for the other light-emitting region ⑥, the light-emitting element ⑥ is turned OFF synchronously with the input of the video signal to the associated display area ⑥. However, once 30% of one vertical scanning period has passed, the light-emitting element ⑥ will be ON for the remaining 70% of the vertical scanning period.

To eliminate the lagging or smearing phenomenon from a motion picture being displayed at a high rate, it is important to minimize the transmitted light while the liquid crystal molecules are responding (i.e., for a while after the video signal has been input). If the respective light-emitting elements 2 are operated by the lighting controller 30 in the above-described manner, then no pixels will be displayed while the liquid crystal molecules are responding. However, once the liquid crystal molecules have finished their response, only pixels in a predetermined state will be displayed. Thus, a quality motion picture can be displayed. As can be seen, the turn-OFF timings of the light-emitting elements 2 are a key to displaying a quality motion picture. Accordingly, the turn-ON and turn-OFF operations of the light-emitting elements are preferably controlled by reference to the turn-OFF timings. In this case, the ON period of each light-emitting element may be adjusted by appropriately changing the turn-ON timing of the light-emitting element. To perform a control in this manner, a control circuit such as that disclosed in Japanese Laid-Open Publication No. 11-20285 may be used as the lighting controller 30. That is to say, the light-emitting elements may be sequentially turned ON and OFF at respective timings that are appropriately controlled by using such a control circuit.

The lighting unit according to the preferred embodiment described above sequentially turns ON and OFF the light-emitting elements provided for the respective light-emitting regions at predetermined intervals, thereby getting light emitted from one of the light-emitting regions after another by the scan lighting technique. Also, the controller 30 supplies drive signals of mutually different types (i.e., having mutually different ON periods during one vertical scanning period) to the respective light-emitting elements, thereby controlling the emission intensities of the light-emitting regions independently. Consequently, a lighting unit having a highly uniform light-emitting plane, on which the luminance hardly varies from place to place, is provided.

Figure 9A:
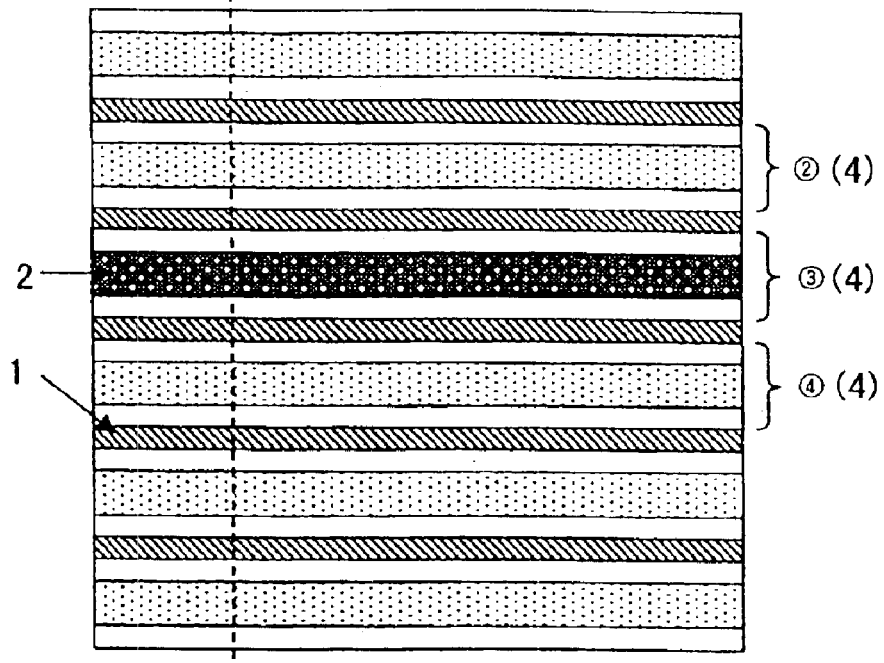
FIG. 9A is a plan view illustrating a lighting unit including a reflector II.
Figure 9B:
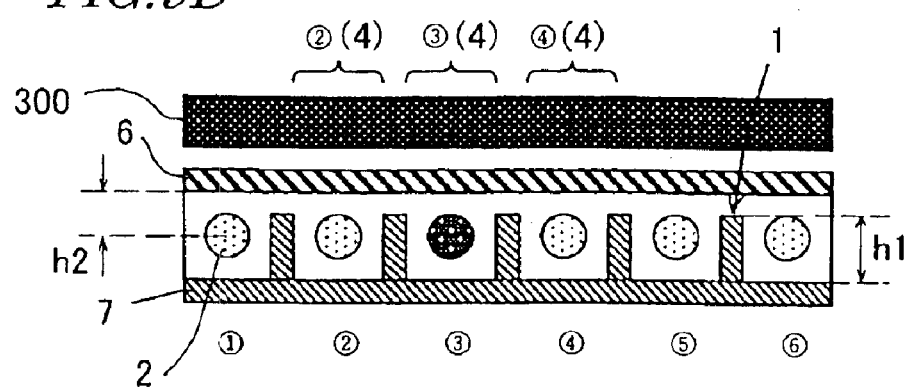
FIG. 9B is a cross-sectional view, taken along the line IXb-IXb shown in FIG. 9A, of a liquid crystal panel including the lighting unit shown in FIG. 9A.

Next, a lighting unit including a different type of reflector II as shown in FIGS. 9A and 9B will be described. The reflector II has the same structure as the reflector I except that the partitions 1 of the reflector II has a height h1 of 7 mm, which is greater than that of the reflector I. The other members of the lighting unit shown in FIGS. 9A and 9B are the same as the counterparts of the lighting unit shown in FIGS. 1A and 1B.

Figure 10:
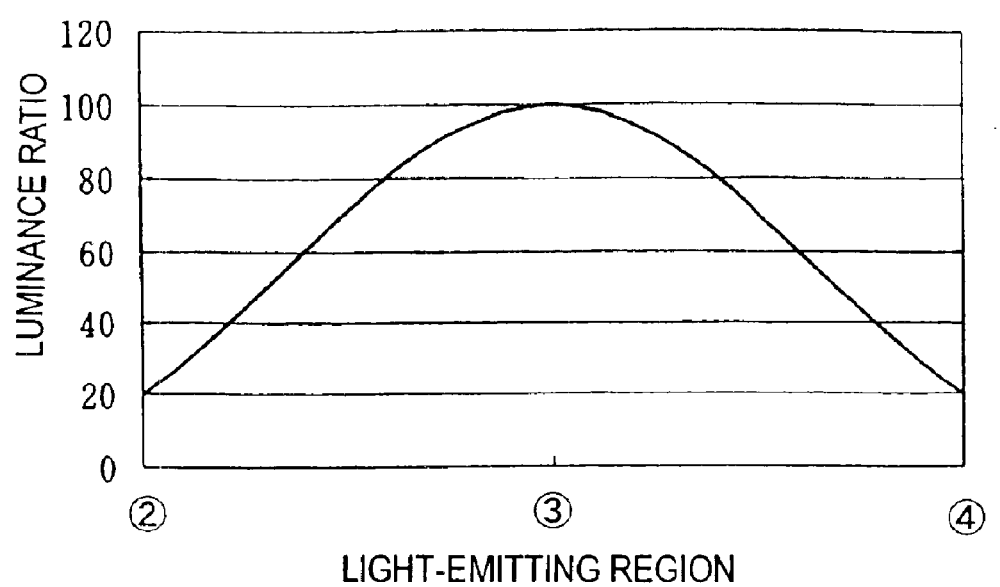
FIG. 10 is a graph showing how one light-emitting element associated with one light-emitting region may affect the other light-emitting regions when the reflector II is used.

As for the lighting unit including this reflector II, the effects of one light-emitting element on the other light-emitting regions were also analyzed by using a luminance meter. As a result, supposing the luminance value of the light-emitting region ③ associated with the ON-state light-emitting element 2 was 100%, the luminances of the two directly adjacent light-emitting regions ② and ④ were approximately 20% but the luminances of the other regions ①, ⑤ and ⑥ were within an error range as shown in FIG. 10.

In an illustrative example to be described below, the lighting unit 100 in which the reflector II is used, the six light-emitting elements 2 that are numbered from ① through ⑥ downward are arranged, and the six light-emitting regions 4 (also numbered from ① through ⑥) are defined on the light-emitting plane, is combined with the liquid crystal panel 300. In this example, the lighting controller 30 is also so constructed as to sequentially turn ON and OFF the respective light-emitting elements 2 synchronously with the input of the vertical sync signal to the liquid crystal panel 300. A drive signal to be supplied to each of the light-emitting elements is a periodic signal, of which one period is as long as one vertical scanning period of the liquid crystal panel 300.

Figure 11:
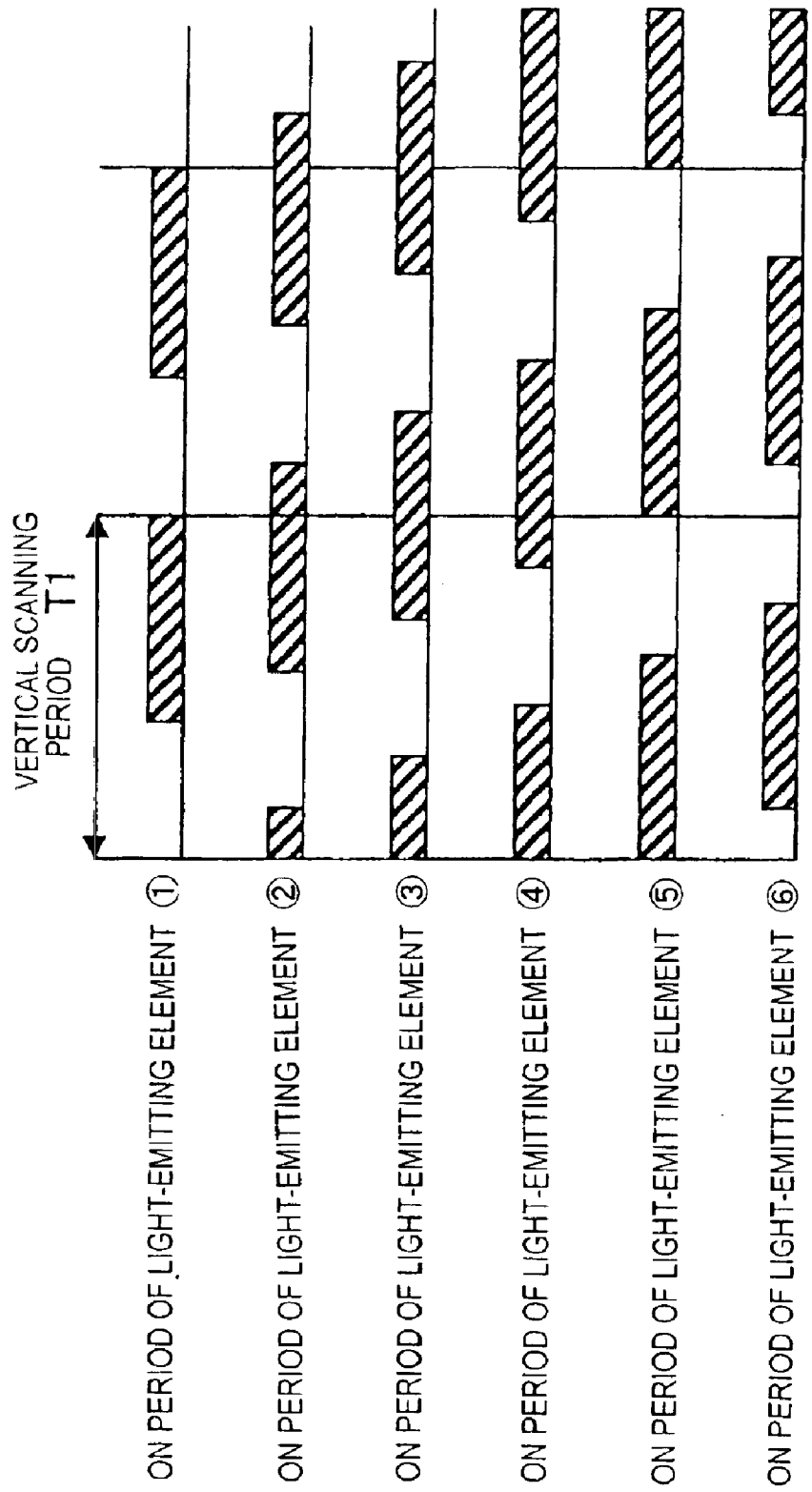
FIG. 11 is a timing diagram showing when the respective light-emitting elements may be turned ON and OFF where the reflector II is used.
Figure 12:
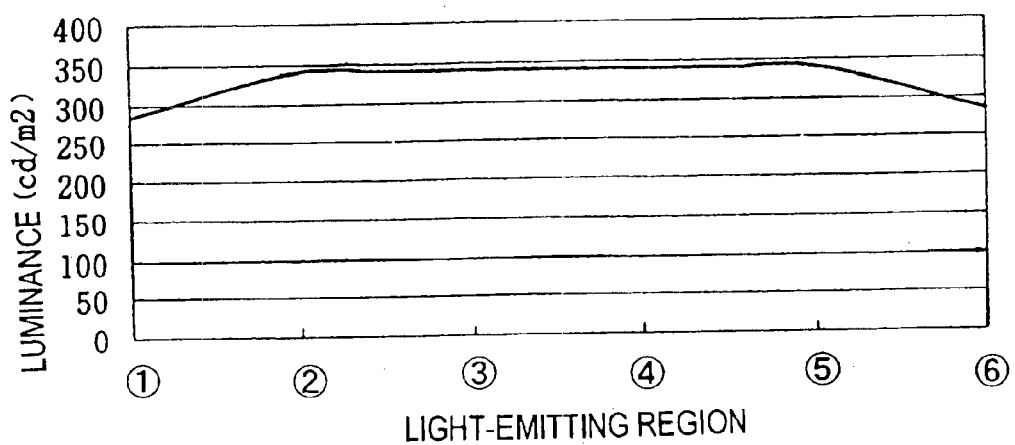
FIG. 12 is a graph showing the resultant luminance values of the respective light-emitting regions for the lighting unit including the reflector II.

For example, each of the light-emitting elements 2 may be turned ON in 60% of one vertical scanning period T1 and turned OFF in the remaining 40% of the period T1 as shown in FIG. 11. In that case, the luminances of the respective light-emitting regions ① through ⑥ measured as shown in FIG. 12: the four inner light-emitting regions ②, ③, ④ and ⑤ had a luminance value of 340 cd/m²; and the two outermost light-emitting regions ① and ⑥ had a luminance value of 290 cd/m². That is to say, the respective light-emitting regions ①, ②, ③, ④, ⑤ and ⑥ had luminance values of approximately 290 cd/m², 340 cd/m², 340 cd/m², 340 cd/m², 340 cd/m² and 290 cd/m², respectively. The results shown in FIG. 12 correspond with those shown in FIG. 10. That is to say, supposing the maximum luminance of one light-emitting region 4 associated with an ON-state light-emitting element 2 is 100%, the luminances of the two directly neighboring light-emitting regions 4 thereof are about 20%.

Figure 13:
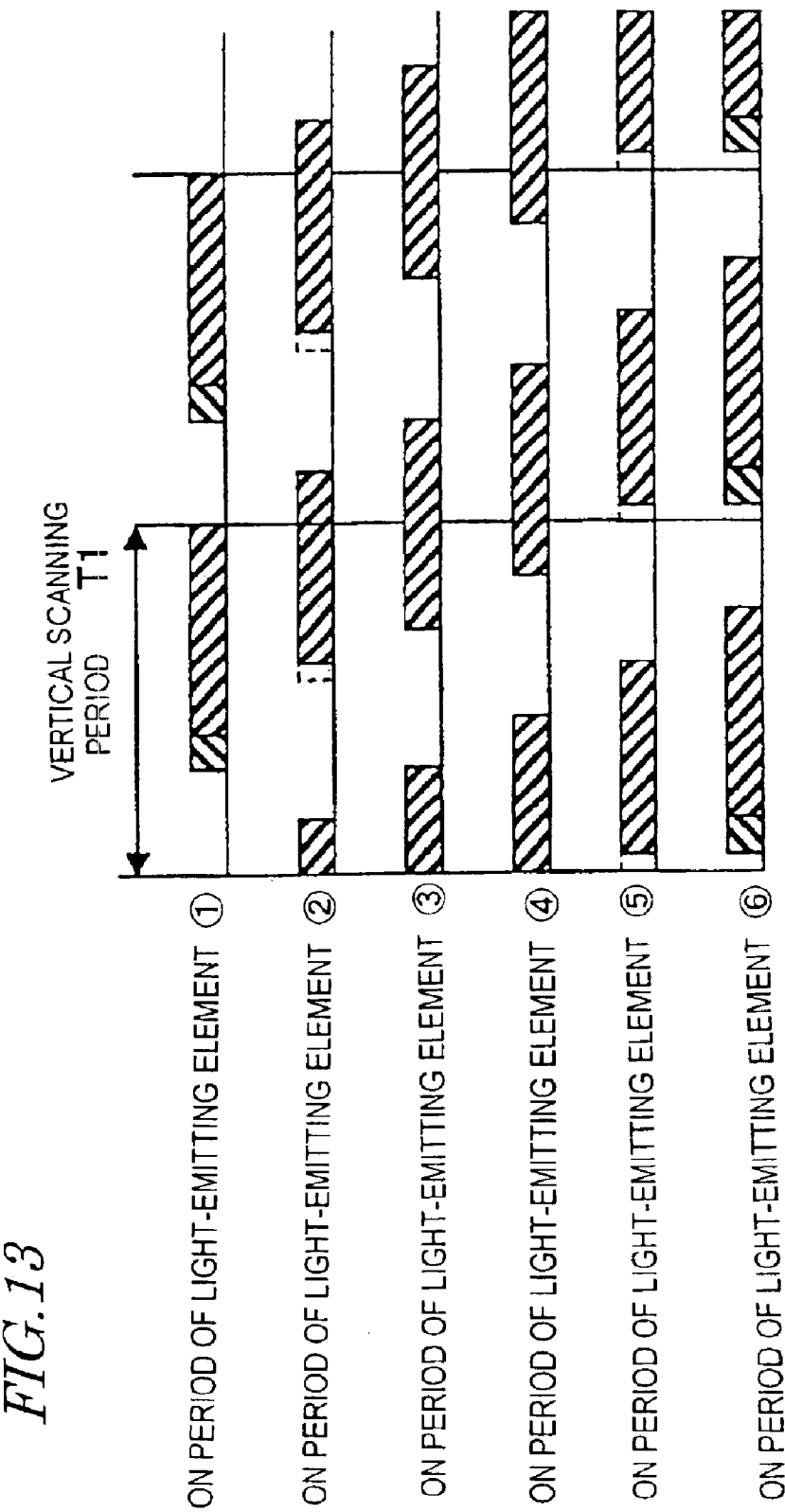
FIG. 13 is a timing diagram showing how the ON period percentages of the respective light-emitting elements may be adjusted to reduce a variation in luminance where the reflector II is used.

To correct such a variation in luminance, the light-emitting elements for the two outermost light-emitting regions ① and ⑥ may be turned ON in 73% of one vertical scanning period, the light-emitting elements for the two next outermost light-emitting regions ② and ⑤ may be turned ON in 57% of one vertical scanning period, and the light-emitting elements for the other two light-emitting regions ③ and ④ may be turned ON in 60% of one vertical scanning period as shown in FIG. 13. As a result, the luminances of the light-emitting regions ① through ⑥ could be substantially equalized with each other to approximately 340 cd/m². Thus, a lighting unit causing substantially no luminance variation as a whole was realized. And when such a lighting unit was combined with a liquid crystal panel, a quality motion picture could be displayed at a desired high rate.

A quality motion picture can be displayed at a high rate in the following manner. Specifically, when the six light-emitting elements 2 are used and each turned ON in 60% of one vertical scanning period, the effective scanning period of one vertical scanning period is preferably equally divided by six to determine the turn-ON and turn-OFF timings of the light-emitting elements 2 as follows.

Figure 14:
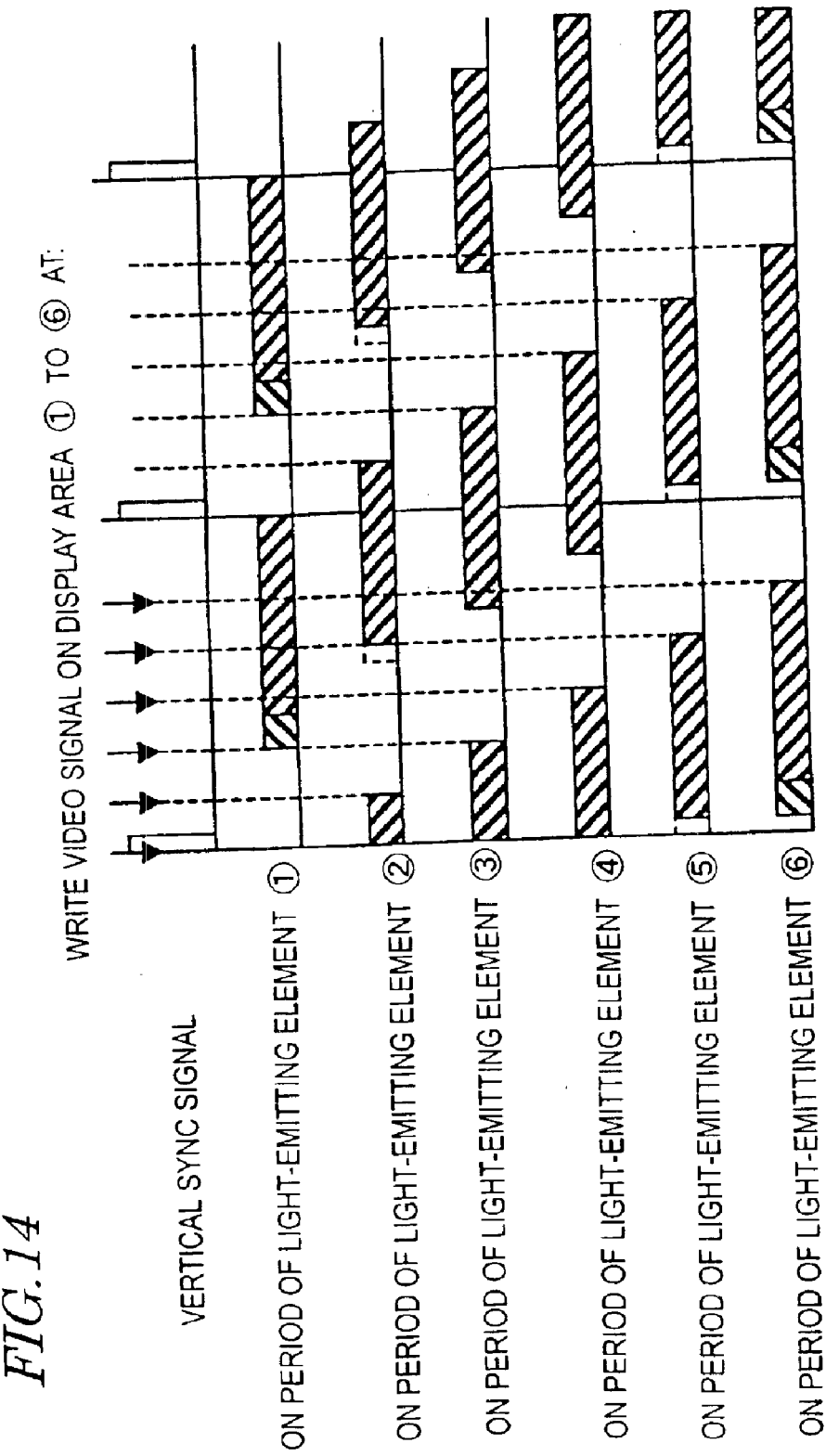
FIG. 14 is a timing diagram showing timing relationships between the video signal and the ON and OFF periods of the light-emitting elements for the lighting unit including the reflector II.

As shown in FIG. 14, the instant a vertical sync signal is input to the liquid crystal panel 300 and a video signal starts to be input to a display area ① associated with the light-emitting region ①, the light-emitting element ① is turned OFF. The light-emitting element ① is kept OFF while the liquid crystal molecules are responding. However, once about 27% of one vertical scanning period has passed, the light-emitting element ① will be ON for the remaining 73% of the period. Next, the instant a video signal starts to be input to a display area ② associated with the light-emitting region ②, the light-emitting element ② is turned OFF. The light-emitting element ② is kept OFF while the liquid crystal molecules are responding. However, once 43% of one vertical scanning period has passed, the light-emitting element ② will be ON for the remaining 57% of the period. Similar operations are performed on the next two light-emitting regions ③ and ④. Specifically, the instant a video signal starts to be input to a display area ③ or ④ associated with the light-emitting region ③ or ④, the light-emitting element ③ or ④ is turned OFF. Once 40% of one vertical scanning period has passed, the light-emitting element ③ or ④ will be ON for the remaining 60% of the period. As for the light-emitting region ⑤, the light-emitting element ⑤ is turned OFF synchronously with the input of the video signal to the associated display area ⑤. However, once 43% of one vertical scanning period has passed, the light-emitting element ⑤ will be ON for the remaining 57% of the period. As for the light-emitting region ⑥, the light-emitting element ⑥ is turned OFF synchronously with the input of the video signal to the associated display area ⑥. However, once 27% of one vertical scanning period has passed, the light-emitting element ⑥ will be ON for the remaining 73% of the period.

To minimize the transmitted light while the liquid crystal molecules are responding, the turn-ON and turn-OFF operations of the respective light-emitting elements are preferably controlled by reference to the turn-OFF timings as in the preferred embodiment where the reflector I is used. In that case, the ON period of each light-emitting element may be adjusted by appropriately changing the turn-ON timing of the light-emitting element.

Figure 15A:
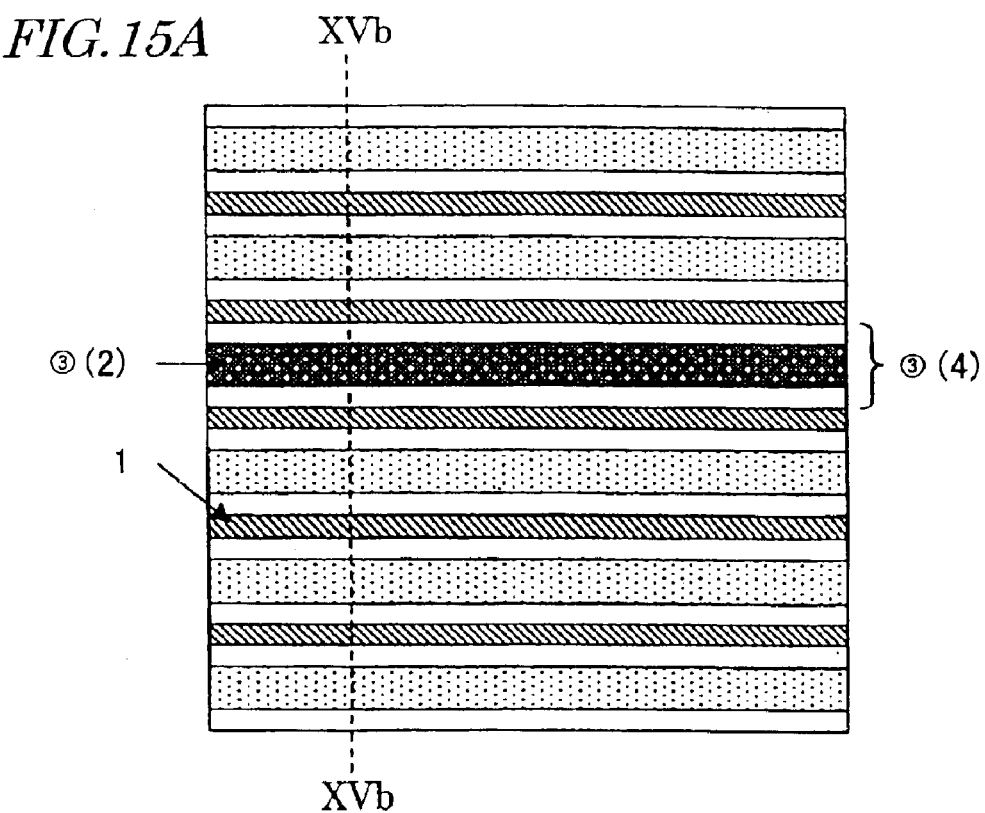
FIG. 15A is a plan view illustrating a lighting unit including a reflector III.
Figure 15B:
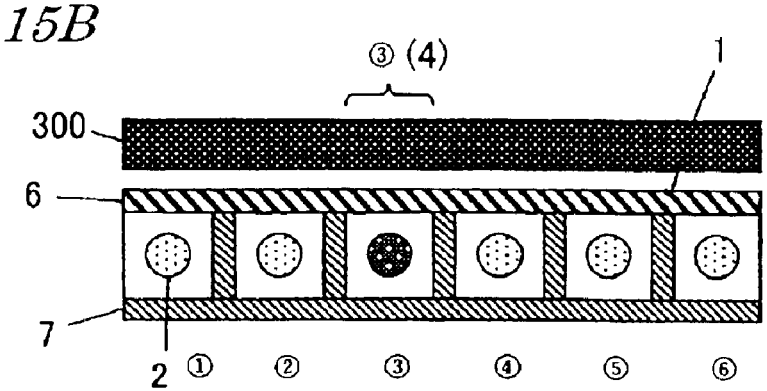
FIG. 15B is a cross-sectional view, taken along the line XVb—XVb shown in FIG. 15A, of a liquid crystal panel including the lighting unit shown in FIG. 15A.

Next, a lighting unit including another different type of reflector III as shown in FIGS. 15A and 15B will be described. The reflector III shown in FIGS. 15A and 15B has the same structure as the reflector I shown in FIGS. 1A and 1B except that the partitions 1 are in close contact with the reflector 7 and the diffuser 6. The other members of the lighting unit shown in FIGS. 15A and 15B are the same as the counterparts of the lighting unit shown in FIGS. 1A and 1B.

As for the lighting unit including this reflector III, the effects of one light-emitting element on the other light-emitting regions were also analyzed by using a luminance meter. As a result, supposing the luminance value of the light-emitting region associated with the ON-state light-emitting element 2 was 100%, the luminances of the two directly adjacent light-emitting regions were almost within an error range. Normally, a completely partitioned structure like this is not preferable because a shadow is cast on the partitions. However, such a problem is avoidable by modifying the structure of the diffuser or by adding a lens sheet, for example.

In an illustrative example to be described below, the lighting unit 100 in which the reflector III is used, the six light-emitting elements 2 that are numbered from ① through ⑥ downward are arranged, and the six light-emitting regions 4 (also numbered from ① through ⑥) are defined on the light-emitting plane, is combined with the liquid crystal panel 300. In this example, the lighting controller 30 is also so constructed as to sequentially turn ON and OFF the respective light-emitting elements 2 synchronously with the input of the vertical sync signal to the liquid crystal panel 300. A drive signal to be supplied to each of the light-emitting elements is a periodic signal, of which one period is as long as one vertical scanning period of the liquid crystal panel 300.

Figure 16:
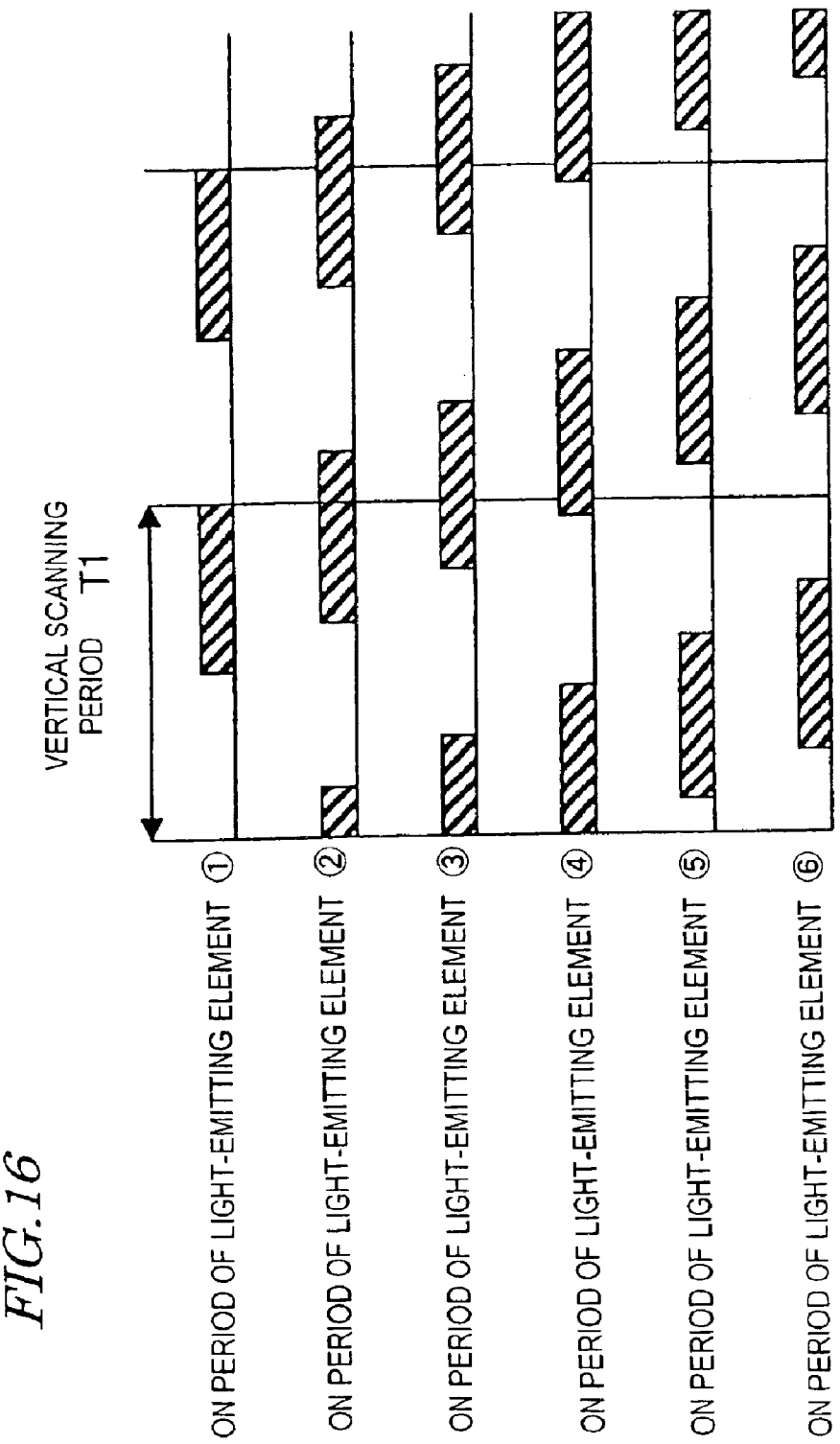
FIG. 16 is a timing diagram showing when the respective light-emitting elements may be turned ON and OFF where the reflector III is used.
Figure 17:
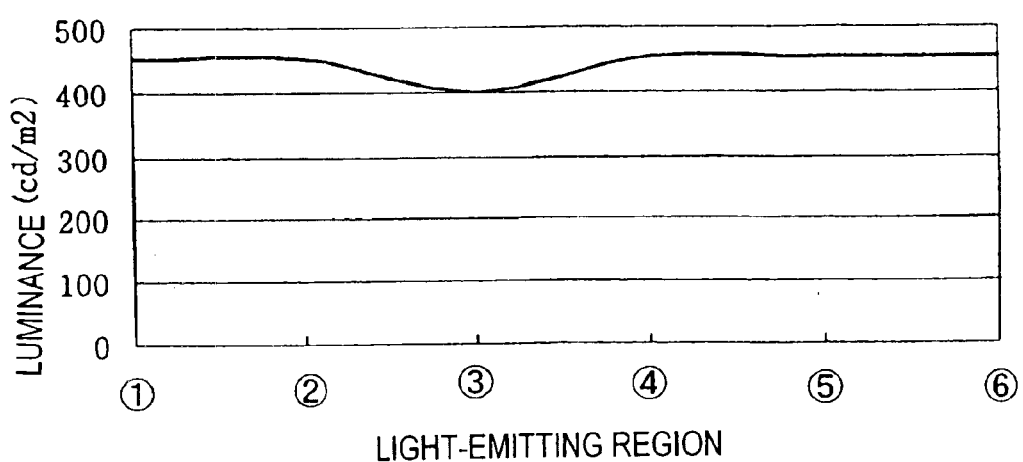
FIG. 17 is a graph showing the resultant luminance values of the respective light-emitting regions for the lighting unit including the reflector III.

For example, each of the light-emitting elements 2 may be turned ON in 50% of one vertical scanning period T1 and turned OFF in the remaining 50% of the period T1 as shown in FIG. 16. In that case, the luminances of the respective light-emitting regions ① through ⑥ measured as shown in FIG. 17: all of the light-emitting regions ① through ⑥ but the light-emitting region ③ had a luminance value of 450 cd/m$^2$; and only the light-emitting region ③ had a luminance value of 400 cd/m$^2$. That is to say, the respective light-emitting regions ①, ②, ③, ④, ⑤ and ⑥ had luminance values of approximately 450 cd/m$^2$, 450 cd/m$^2$, 400 cd/m$^2$, 450 cd/m$^2$, 450 cd/m$^2$ and 450 cd/m$^2$, respectively. These results were obtained probably because the luminous efficacy of the light-emitting element ③ associated with the light-emitting region ③ decreased compared to the other light-emitting elements.

Figure 18:
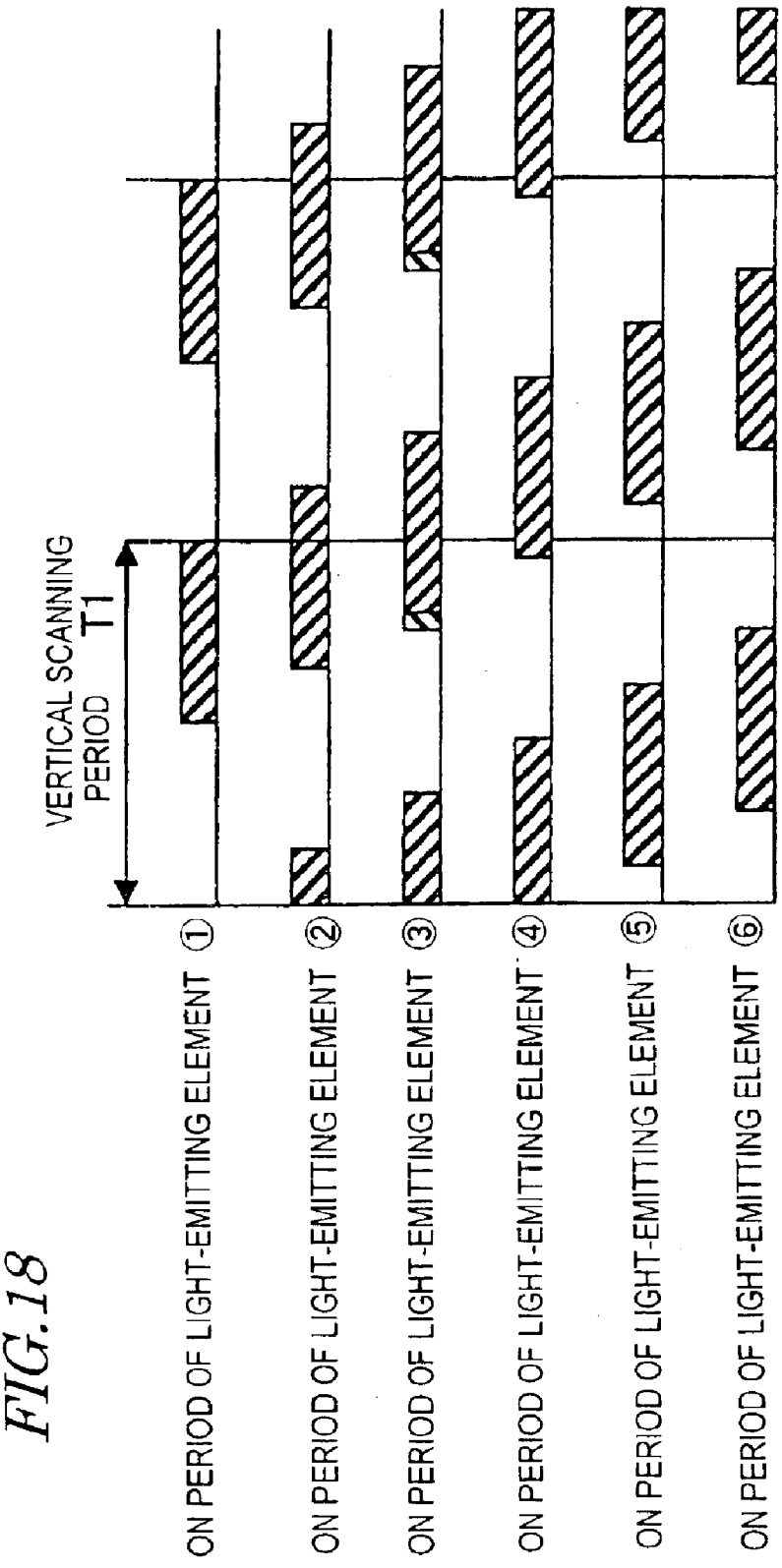
FIG. 18 is a timing diagram showing how the ON period percentages of the respective light-emitting elements may be adjusted to reduce a variation in luminance where the reflector III is used.
Figure 19B:
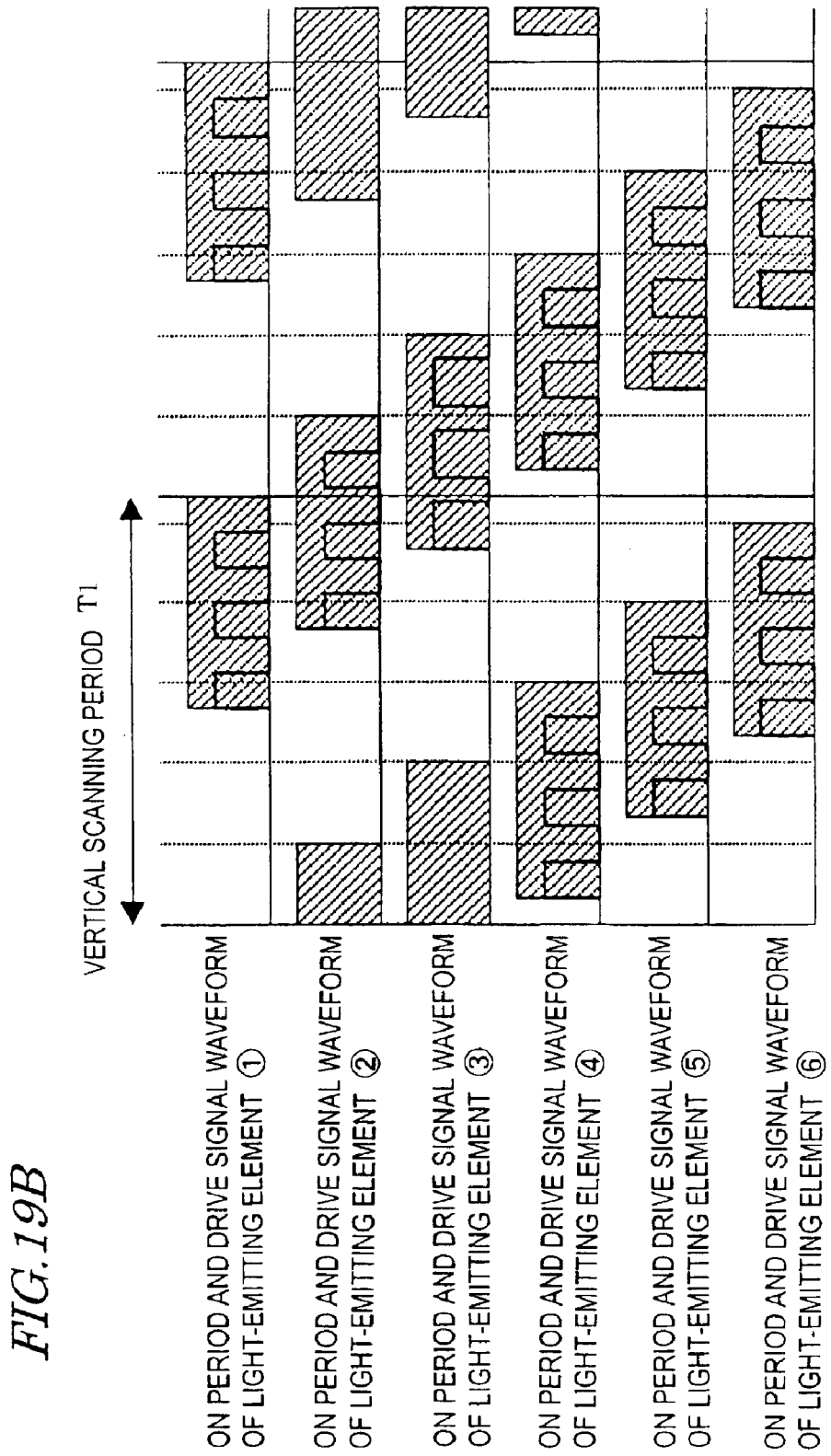
FIG. 19B is a timing diagram showing the waveforms of drive signals and the periods in which the drive signals are supplied to the respective light-emitting elements for the lighting unit including the reflector III, where the ON periods perceivable to the human eyes are supposed to be of the same length for the respective light-emitting elements and the drive signals have different ON-OFF ratios.

To correct such a variation in luminance, the light-emitting elements for all of the light-emitting regions ① through ⑥ but the light-emitting region ③ may be turned ON in 50% of one vertical scanning period, while only the light-emitting element for the light-emitting region ③ may be turned ON in 56% of one vertical scanning period as shown in FIG. 18. As a result, the luminances of the light-emitting regions ① through ⑥ could be substantially equalized with each other to approximately 450 cd/m$^2$. Thus, a lighting unit causing substantially no luminance variation as a whole was realized. And when such a lighting unit was combined with a liquid crystal panel, a quality motion picture could be displayed at a desired high rate.

As shown in FIG. 19A, the respective light-emitting elements (or cold-cathode tubes) may also be turned ON and OFF in this specific example at the same timings as the example where the reflector I is used. Also, the ON period of each light-emitting element is preferably adjusted by appropriately changing the turn-ON timing of the light-emitting element.

In the preferred embodiments described above, each light-emitting element is turned ON and OFF within one vertical scanning period. Alternatively, each light-emitting element may be in a "reduced-luminance state" instead of being turned OFF. Even so, a lighting unit, which has a luminance uniform enough to find application in displaying a motion picture at a high rate, is also realized. As used herein, the "reduced-luminance state" refers to a state of a light-emitting element having a luminance value that is lower than the ON-state value thereof but that is higher than that of the OFF-state value thereof. If a light-emitting element is not turned OFF completely but has its luminance reduced in this manner, the damage done on the luminophor of the light-emitting element can be decreased significantly and the lifetime of the light-emitting element can be extended greatly. In addition, since there are no OFF periods, the luminance on the screen does not decrease considerably.

In the preferred embodiment described above, the turn-ON and turn-OFF timings of the respective light-emitting elements are adjusted, thereby controlling the total ON period of one vertical scanning period and realizing a lighting unit that causes almost no luminance variation. However, the total ON period does not have to be controlled by this particular technique.

A lighting unit causing almost no luminance variation is also realized by adjusting the luminances of the respective light-emitting regions in the following manner. Specifically, even if the light-emitting elements are all turned ON or OFF at regular intervals, the luminances may also be adjusted by getting the waveforms of the drive signals during the ON periods controlled by the controller so that each of the light-emitting elements is turned OFF for too short a period of time to be perceivable to the human eyes during its ON periods. That is to say, the controller may apply a turn-OFF pulse to each light-emitting element during its ON period. For example, as for the lighting unit including the reflector III, the cold-cathode tubes (or light-emitting elements) ① through ⑥ all have a human perceivable ON period of the same length as indicated by hatching in FIG. 19B. However, in their respective ON periods, drive signals having the same waveform are supplied to the cold-cathode tubes ①, ②, ④, ⑤ and ⑥, while a drive signal having a different waveform is supplied to the other cold-cathode tube ③. That is to say, the drive signal to be supplied to each of the cold-cathode tubes during its ON period is a rectangular wave that has an ON level (or high level) that turns the cold-cathode tube ON and an OFF level (or low level) that turns it OFF. In the specific example shown in FIG. 19B, the ON-OFF ratio (i.e., the duty cycle) of the drive signal to be supplied to the cold-cathode tube ③ is 56:44, while the ON-OFF ratio (i.e., the duty cycle) of the drive signals to be supplied to the other cold-cathode tubes ①, ②, ④, ⑤ and ⑥ is 50:50. In this manner, the luminance value of the cold-cathode tube ③ during its ON period can be equalized with that of the other cold-cathode tubes ①, ②, ④, ⑤ and ⑥ during their ON periods. Thus, a lighting unit causing almost no luminance variation can be obtained. In this case, the ON periods perceivable to the human eyes are still the same for the respective light-emitting regions. Accordingly, although the luminances are actually adjusted, a display device including such a lighting unit allows the viewer to sense no variations in the quality of the motion picture displayed.

The technique of controlling the turn-ON and turn-OFF timings and the technique of inserting short OFF periods (or drive signal OFF-level periods) into each ON period have their own merits and demerits, and neither of these is always superior to, or more preferable than, the other. It is rather preferable to adopt one of these techniques according to the intended application of the display device. Thus, the effects of the present invention are equally achieved by any of these techniques. For example, if the display device needs to exhibit relatively stabilized performance, then the OFF period inserting technique would be more advantageous. On the other hand, if the motion picture display performance of the display device needs to be improved almost to the limit, then the turn-ON and turn-OFF timing control would work better. It is naturally possible to use these two techniques in combination.

In the preferred embodiments described above, a number of light-emitting elements are sequentially turned ON by the scan lighting technique. However, even when these light-emitting elements are kept ON just like normal lights, the emission intensities of the light-emitting elements are also controllable by getting the magnitudes of the currents or voltages, supplied or applied to the light-emitting elements, (i.e., the maximum signal intensities of their drive signals) adjusted by the lighting controller.

Embodiment 2

Hereinafter, a lighting unit according to a second specific preferred embodiment of the present invention will be described with reference to FIGS. 20A through 23. In FIGS. 20A through 23, any member illustrated in multiple drawings but having substantially the same function will be identified by the same reference numeral.

Figure 20A:
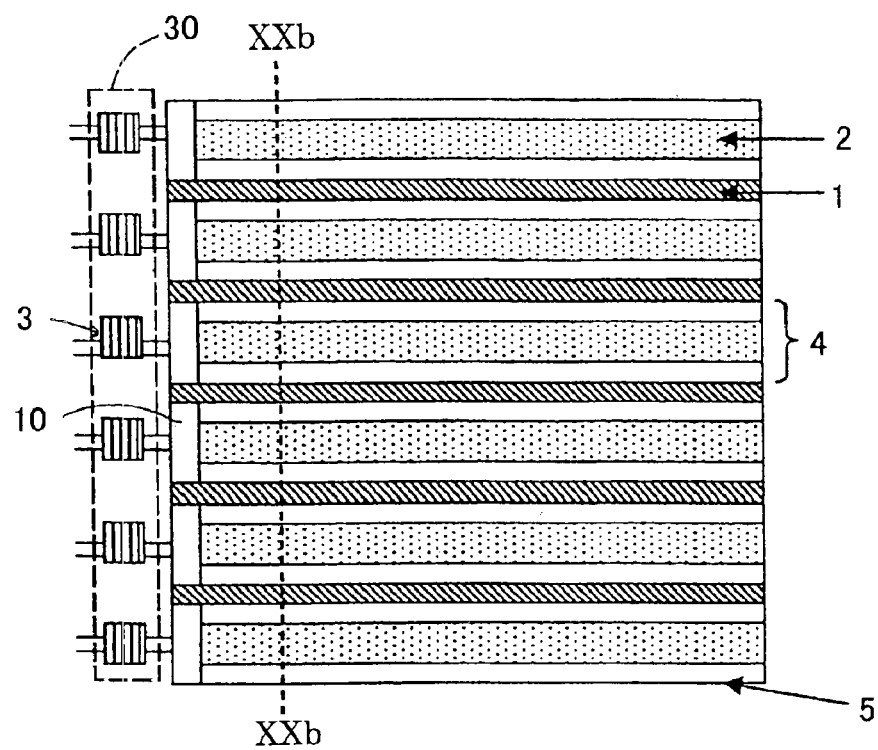
FIGS. 20A and 20B are respectively a plan view and a cross-sectional view, taken along the line XXb—XXb shown in FIG. 20A, of a lighting unit according to a second specific preferred embodiment of the present invention.
Figure 20B:
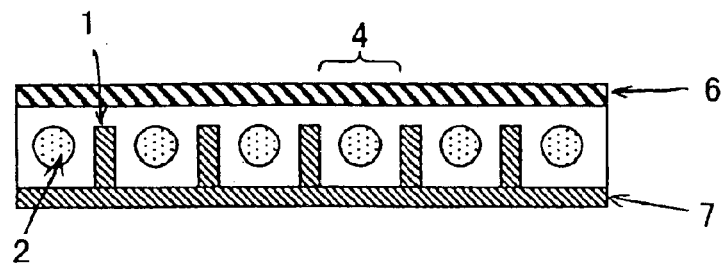

As shown in FIG. 20A, the lighting unit 200 of the second preferred embodiment includes not only all the components of the lighting unit 100 of the first preferred embodiment but also instruments 10 for measuring the luminances of the respective light-emitting regions and a circuit (not shown) for feeding back the luminance information to the lighting controller 30.

Photodiodes may be used as the instruments 10. By using the photodiodes, the variation in luminance of each light-emitting region with time and the difference in luminance between the light-emitting regions can be detected. As long as the instruments 10 can detect the luminances of the respective light-emitting regions, the instruments 10 may also be any of various other types of instruments, e.g., luminance meters or photometers. For example, even when the luminance of one of the light-emitting regions decreases suddenly during its ON period, the associated instrument 10 can sense that decrease in luminance. The feedback circuit that is connected to the instruments 10 feeds the luminance information back to the lighting controller 30 that is connected to the light-emitting elements 2. In accordance with that information, the lighting controller 30 can correct the luminances of the light-emitting regions. Such a sudden luminance drop may occur not only at the ends of the lighting unit 200 but also in any other part thereof. Accordingly, it is necessary to measure and monitor the luminances of the respective light-emitting regions.

Figure 21:
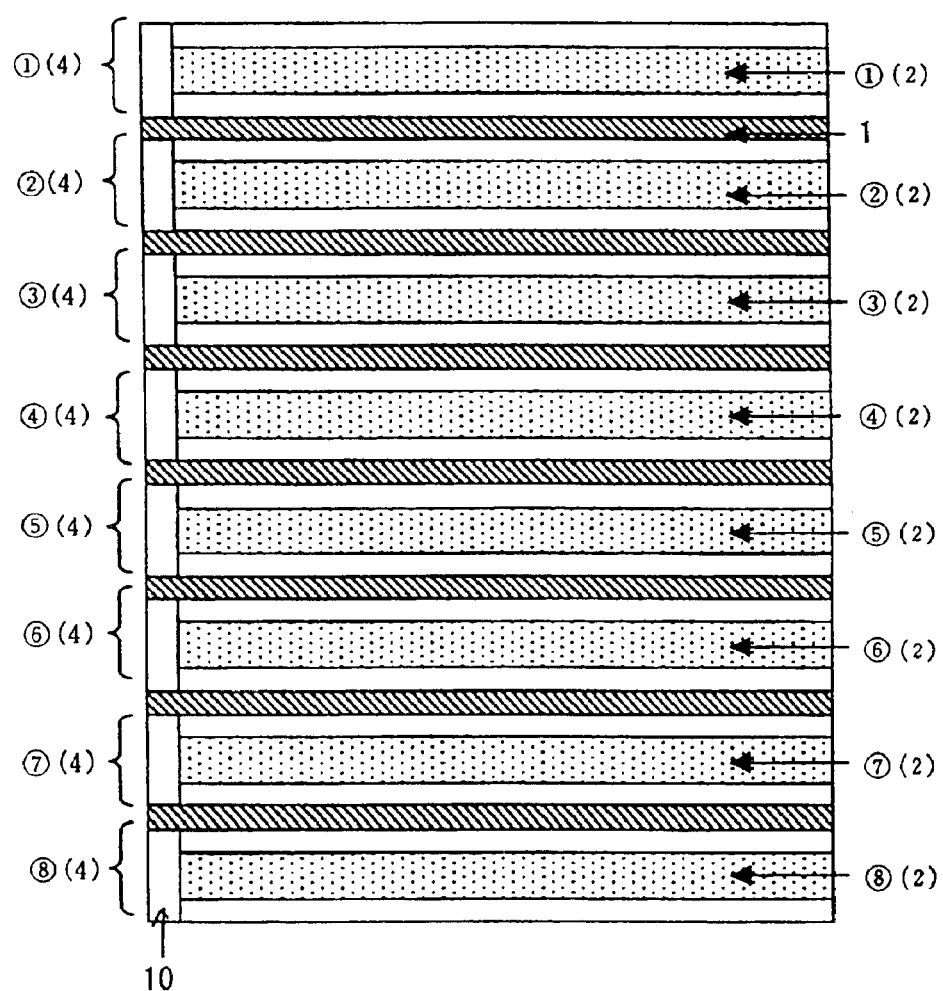
FIG. 21 is a plan view of another lighting unit according to the second preferred embodiment.

In an illustrative example to be described below, a lighting unit, which includes the reflector I, light-emitting elements (or cold-cathode tubes) 2 and diffuser 6 and in which one light-emitting element 2 is provided for each of multiple light-emitting regions 4 defined by the partitions 1 as in the first preferred embodiment described above, is combined with the liquid crystal panel 300 as an image display unit. In the lighting unit 200 of this preferred embodiment, however, eight light-emitting regions 4 are defined by the partitions 1 on the reflector I and eight light-emitting elements ① through ⑧ are respectively provided for the eight light-emitting regions 4 as shown in FIG. 21.

In this lighting unit 200, the lighting controller 30 is also so constructed as to sequentially turn ON and OFF the respective light-emitting elements ① through ⑧ synchronously with the input of a vertical sync signal to the liquid crystal panel 300. A periodic drive signal, of which one period has the same length as one vertical scanning period of the liquid crystal panel 300, is supplied to each of the light-emitting elements. Also, the instrument 10 provided for each light-emitting region feeds back the luminance information to the control circuit 3 that is connected to the associated light-emitting element. In accordance with the output of the instrument 10 (i.e., the luminance measured), the control circuit 3 can change the drive signal to be supplied to the associated light-emitting element 2.

In an illustrative example to be described below, drive signals that turn the respective light-emitting elements 2 ON in 50% of one vertical scanning period T1 and turn them OFF in the remaining 50% of the period T1 are initially supplied to the respective light-emitting elements. Then, the drive signals are subjected to a feedback control in such a manner as to minimize the difference in luminance between the respective light-emitting regions as detected by the instruments 10.

The feedback control may be carried out in the following manner. For example, if the luminance value of one light-emitting region as measured by the instrument 10 is found smaller than a predetermined target luminance value, then the lighting controller 30 supplies such a drive signal as to increase the percentage of the ON period to one vertical scanning period T1 to the associated light-emitting element. On the other hand, if the luminance value of one light-emitting region as measured by the instrument 10 is found larger than the predetermined target luminance value, then the lighting controller 30 supplies such a drive signal as to decrease the percentage of the ON period to one vertical scanning period T1 to the associated light-emitting element.

Suppose a light-emitting region, associated with a light-emitting element that has been turned ON for a period $T_{on}$ within one vertical scanning period T1, had a luminance value L. In that case, if the luminance value L is smaller than a target luminance value $L_t$, then the percentage of the ON period $T_{on}$ to one vertical scanning period T1 may be increased by 2%. On the other hand, if the luminance value L is larger than the target luminance value $L_t$, then the percentage of the ON period $T_{on}$ to one vertical scanning period T1 may be decreased by 2%. Thereafter, the same control is performed a number of times. That is to say, the luminance value L of the same light-emitting region is measured and compared with the target luminance value $L_t$ over and over again and the length of the ON period $T_{on}$ is further increased or decreased based on the result of comparison. These feedback control operations are preferably performed until the luminance value L measured becomes approximately equal to the target luminance value $L_t$.

It should be noted that the target luminance value $L_t$ may be either a predefined one or obtained as the average of the luminances L of all light-emitting regions. However, when the average luminance value of the light-emitting regions is used as the target luminance value $L_t$, the target luminance value $L_t$ might vary and diverge. Thus, upper and lower limits are preferably defined for the target luminance value $L_t$.

In the illustrative example described above, the percentage of the ON period $T_{on}$ to one vertical scanning period T1 is either increased or decreased by 2%. However, this increase or decrease may be changed appropriately. For example, if the increase and decrease are defined at 5%, the actual luminance value L may be different from the target luminance value $L_t$ by about ±5% or less even after the luminance value L has been corrected by the feedback control. However, this variation will be negligible unless the variation of such a degree is observed as a variation in luminance of the overall lighting unit. Also, if the increase and decrease defined are too small, then it would take too much time to correct the luminance value. For that reason, the increase and decrease are preferably at least about 1%.

The luminances of the respective light-emitting regions are preferably corrected one after another by such a feedback control technique within one vertical scanning period T1. However, since the luminance value normally does not change so steeply, the luminance value of just one light-emitting region may be corrected either per vertical scanning period T1 or per second.

Figure 22:
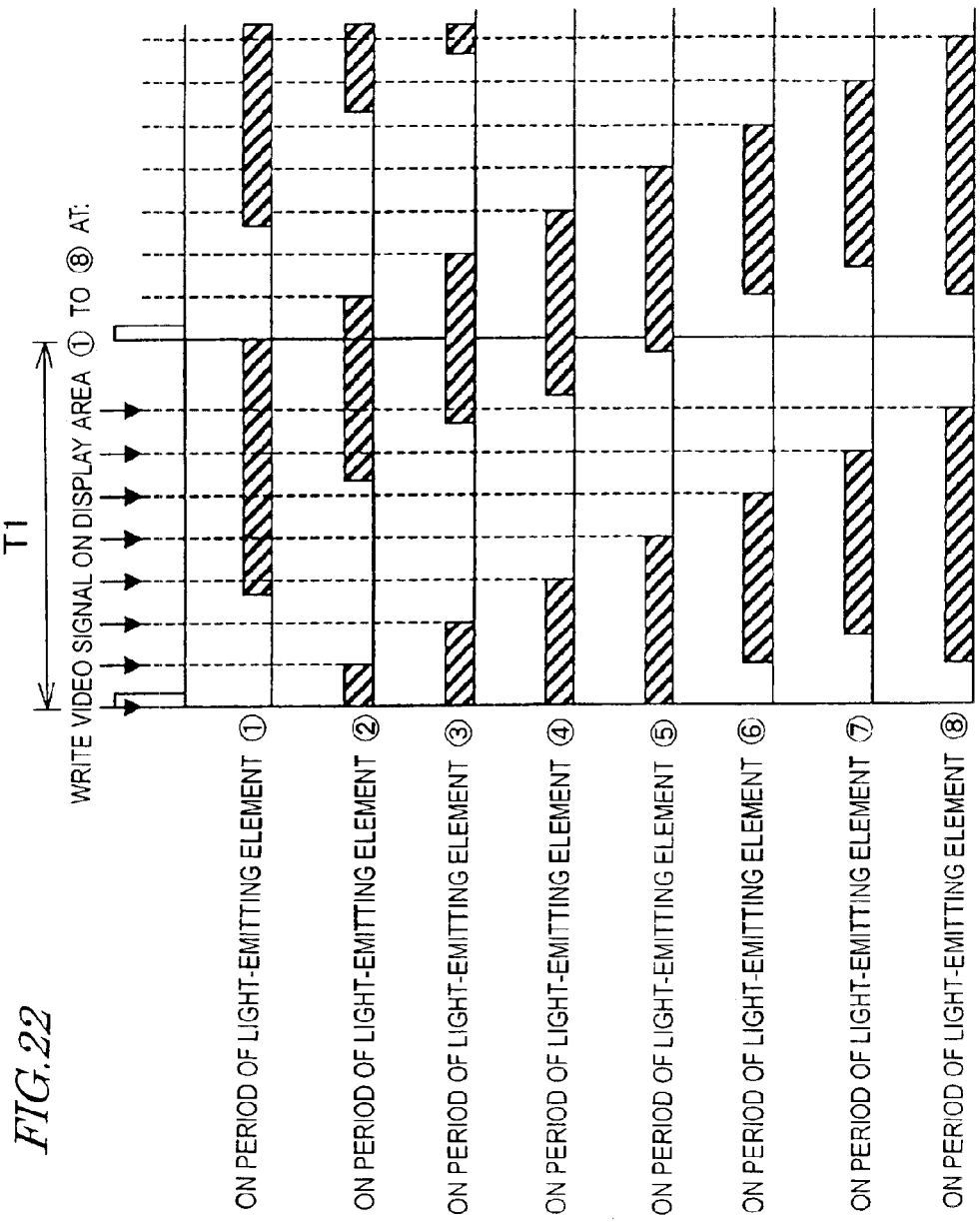
FIG. 22 is a timing diagram showing timing relationships between the video signal and the ON and OFF periods of the light-emitting elements where the ON period percentages of the respective light-emitting elements are adjusted to reduce a variation in luminance for the lighting unit shown in FIG. 21.

When the lighting unit was subjected to a feedback control like this, the luminances of the respective light-emitting regions were substantially equalized with each other to about 360 cd/m². The duty cycles of the drive signals that were supplied to the respective light-emitting elements ① through ⑧ (i.e., the percentages of the ON periods of the respective light-emitting elements to one vertical scanning period T1) were also measured. As a result, the light-emitting elements ① through ⑧ were respectively turned ON in 70%, 50%, 48%, 50%, 50%, 48%, 50% and 70% of one vertical scanning period T1 as shown in FIG. 22.

These results substantially correspond with the ON periods of the respective light-emitting elements that are obtained through the following calculation to substantially equalize the luminances of the light-emitting regions with the target luminance $L_t$. In this case, supposing the luminance value of a light-emitting region associated with an ON-state light-emitting element is 100%, those of the two directly neighboring light-emitting regions are affected by 30%, those of the two outer light-emitting regions 10% and those of the two even outer light-emitting regions 0%. Specifically, suppose the (front) luminance values of the light-emitting elements provided for a number n of light-emitting regions Nos. 0, 1, ..., and n−1 are represented by $Y_0, Y_1, \ldots,$ and $Y_{n-1}$, the percentages of the ON periods of the light-emitting elements to one vertical scanning period T1 are represented by $t_0, t_1, \ldots,$ and $t_{n-1}$, and the luminances of the respective light-emitting regions are affected by the light-emitting element associated with a predetermined light-emitting region m (where $0 \leq m \leq n-1$) by $f_m = 100\%$, $f_{m\pm1} = 30\%$ and $f_{m\pm2} = 10\%$ according to the supposition described above. Then, the luminance value $L_m$ of the light-emitting region m is given by:

$$Lm = Y_{m-2} \times t_{m-2} \times f_{m-2} + Y_{m-1} \times t_{m-1} \times f_{m-1} + Y_m \times t_m \times f_m + Y_{m+1} \times t_{m+1} \times f_{m+1} + Y_{m+2} \times t_{m+2} \times f_{m+2}$$

The luminances $L_1, L_2, \ldots,$ and $L_{n-1}$ of the respective light-emitting regions may be obtained by this equation. And if the luminances $L_1, L_2, \ldots,$ and $L_{n-1}$ are supposed to be equal to the target luminance value $L_t$ for calculation purposes, then the ON period percentages t of the respective light-emitting elements can be obtained through calculation. According to this method, the ON period percentages t of the light-emitting elements ① through ⑧ are respectively calculated at 70%, 49%, 48%, 51%, 51%, 48%, 49% and 70%.

Figure 23:
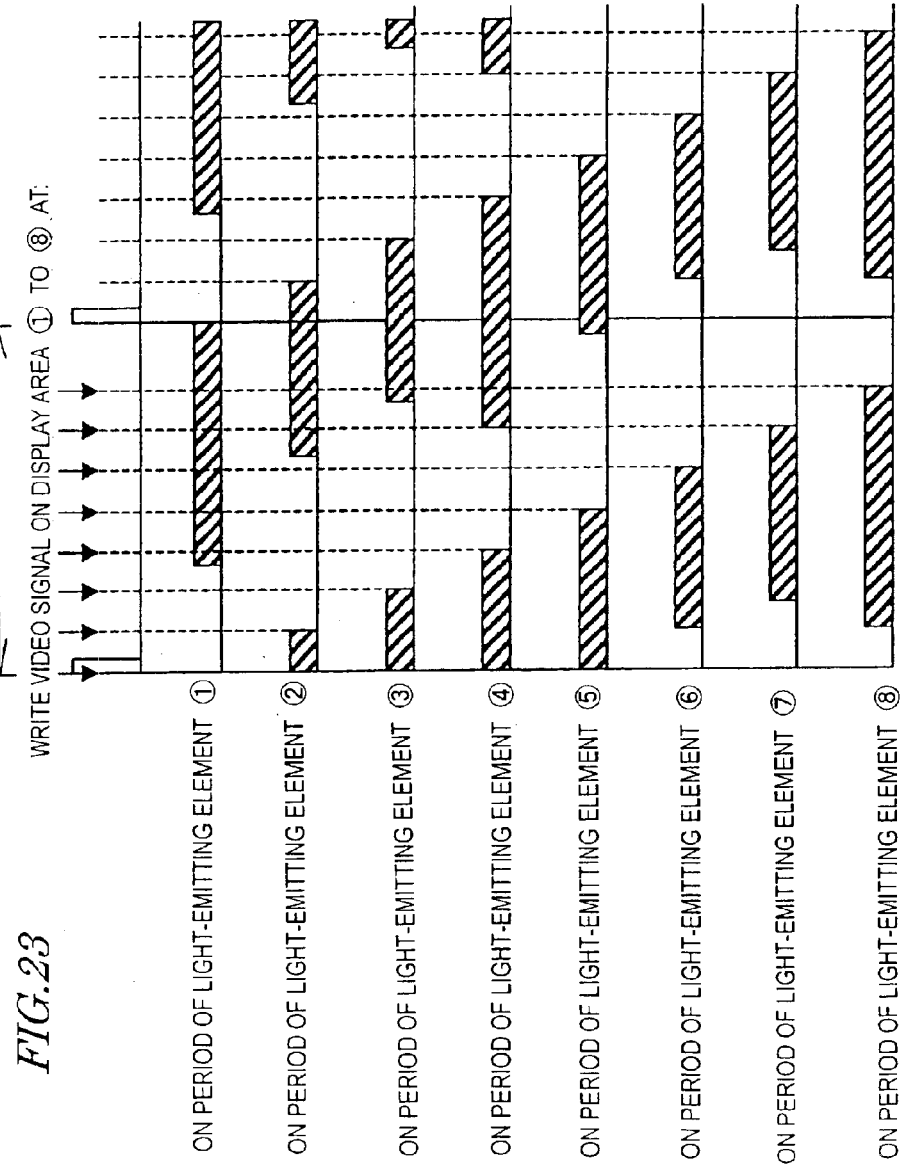
FIG. 23 is a timing diagram showing timing relationships between the video signal and the ON and OFF periods of the light-emitting elements where the ON period percentages of the respective light-emitting elements have been adjusted because a variation in luminance was sensed in the lighting unit shown in FIG. 21.
Figure 24A:
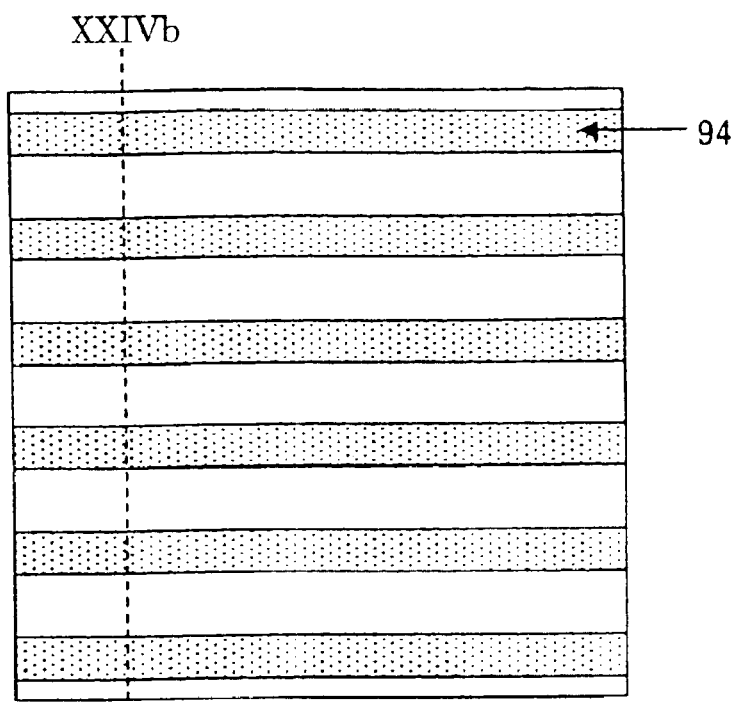
FIGS. 24A and 24B are respectively a plan view, and a cross-sectional view taken along the line XXIVb—XXIVb shown in FIG. 24A, of a conventional lighting unit.
Figure 24B:
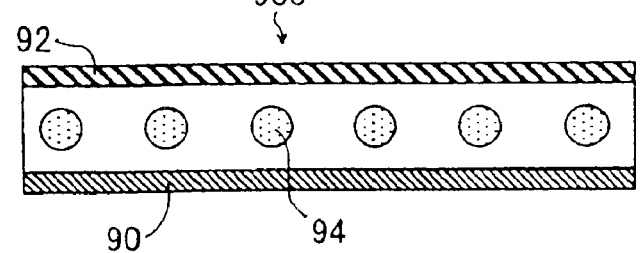

Thereafter, an intentionally decreased voltage was applied to the light-emitting element ④ to decrease the luminance value thereof to 80%. However, when the lighting unit was subjected to the feedback control, no luminance variation was observed and the luminances of the respective light-emitting regions were substantially equalized with each other to about 360 cd/m². The duty cycles of the drive signals that were supplied to the respective light-emitting elements ① through ⑧ (i.e., the ON period percentages of the respective light-emitting elements with respect to one vertical scanning period T1) were also measured. As a result, the light-emitting elements ① through ⑧ were respectively turned ON in 70%, 50%, 48%, 64%, 50%, 48%, 50% and 70% of one vertical scanning period T1 as shown in FIG. 23.

The ON period percentages calculated by the above method substantially match with the ON period percentages that were actually measured except that of the light-emitting element ④. The reason is as follows. Specifically, since the luminance value of the light-emitting element ④ was decreased intentionally, the instruments 10 measure the luminances of the light-emitting regions ① through ⑧ as 280 cd/m², 340 cd/m², 350 cd/m², 320 cd/m², 350 cd/m², 360 cd/m², 340 cd/m² and 280 cd/m², respectively. Thus, the information about this luminance variation is fed back from the instruments 10 to the control circuits 3 for the respective light-emitting elements 2. In accordance with that information, the lighting controller 30 adjusted the ON period percentages of the light-emitting elements ① through ⑧ to 70%, 49%, 48%, 63%, 51%, 48%, 49% and 70%, respectively. As a result, a lighting unit causing substantially no luminance variation overall could be obtained and a quality motion picture could be displayed at a desired high rate.

In the preferred embodiment described above, the luminances of the respective light-emitting elements 2 are adjusted by providing means for measuring the luminances for the light-emitting regions 4 and by continuously monitoring the luminances. In that case, even if one of the ON-state light-emitting elements has decreased its luminance, that luminance drop is quickly correctable. That is to say, the instrument provided for the light-emitting region 4 that emits an insufficient quantity of light senses the luminance drop immediately and sends a signal to the light controller 30, thereby getting the luminance adjusted by extending the ON period of the light-emitting element 2 in question, for example.

To display a quality motion picture at a desired high rate, it is important to minimize the transmitted light while the liquid crystal molecules are responding as in the first preferred embodiment described above. For that purpose, the turn-OFF timings of the light-emitting elements 2 are a key. Accordingly, the ON period percentages are preferably adjusted by changing the turn-ON timings.

In the second preferred embodiment described above, the reflector I is used for illustrative purposes only. Alternatively, any of the other reflectors II and III described for the first preferred embodiment may also be used. This is because no matter which of the reflectors I, II and III is used, the luminances can also be adjusted and a lighting unit that emits light of substantially the same luminance from the respective light-emitting regions can also be obtained by subjecting the drive signals, supplied to the respective light-emitting elements, to the feedback control.

In the preferred embodiments described above, each light-emitting element is turned ON and OFF within one vertical scanning period. Alternatively, each light-emitting element may exhibit a "reduced-luminance state" instead of being turned OFF. Even so, a lighting unit, which has a luminance uniform enough to find application in displaying a motion picture at a high rate, is also realized. As used herein, the "reduced-luminance state" refers to a state of a light-emitting element having a luminance value that is lower than the ON-state value thereof but that is higher than that of the OFF-state value thereof. If a light-emitting element is not turned OFF completely but has its luminance reduced in this manner, the damage done on the luminophor of the light-emitting element can be decreased significantly and the lifetime of the light-emitting element can be extended greatly. In addition, since there are no OFF periods, the luminance on the screen does not decrease considerably.

In the second preferred embodiment described above, the turn-ON and turn-OFF timings of the respective light-emitting elements are adjusted, thereby realizing a lighting unit that causes almost no luminance variation. However, as already described with reference to FIG. 19B, the luminances of the respective light-emitting regions may also be adjusted by equalizing the ON period lengths of the light-emitting elements to the human eyes and by changing the ON-OFF ratios (i.e., duty cycles) of the drive signals that are supplied to the light-emitting elements during the ON periods. Even so, a lighting unit causing almost no luminance variation can also be obtained.

Also, in the second preferred embodiment described above, a number of light-emitting elements are sequentially turned ON by the scan lighting technique. However, even when these light-emitting elements are kept ON just like normal lights, the luminances of the light-emitting elements are also controllable by getting the magnitudes of the currents or voltages, supplied or applied to the light-emitting elements, (i.e., the maximum signal intensities of their drive signals) adjusted by the lighting controller.

The lighting unit according to various preferred embodiments of the present invention described above can control each of multiple light-emitting elements, respectively provided for the same number of light-emitting regions, into one of mutually different emission states. For example, a light-emitting element provided for some light-emitting region may affect two directly adjacent light-emitting regions. However, as for a light-emitting element provided for one of the two outermost light-emitting regions, there is just one light-emitting region next to the light-emitting element. That is to say, since the light-emitting element affects the adjacent light-emitting region to a lesser degree, the luminance value of that light-emitting region may be lower than those of the other light-emitting regions. Even so, according to preferred embodiments of the present invention, the emission intensity of the light-emitting elements provided for the two outermost light-emitting regions may be set higher than that of the other light-emitting elements. In this manner, the luminances of the respective light-emitting regions can be substantially equalized with each other and the lighting unit can emit light almost without causing any luminance variation.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A lighting unit comprising:
    a reflector;
    a plurality of light-emitting elements, which are respectively provided on the reflector for a plurality of light-emitting regions; and
    a controller for supplying a periodic drive signal to each of the light-emitting elements, thereby defining a state of the light-emitting element,
    wherein the lighting unit illuminates a display panel including a light modulating layer with light that has been emitted from the light-emitting elements, and
    wherein the controller supplies drive signals of substantially different types to at least two of the light-emitting elements so that the at least two light-emitting elements are turned on for different percentages of a scanning period or cycle in order to reduce variation in luminance.

2. The lighting unit of claim 1, further comprising at least one partition on the reflector, the light-emitting regions being defined by the at least one partition.

3. The lighting unit of claim 1, wherein the controller supplies a drive signal, having first and second signal intensities within one period, to each of the light-emitting elements, the light-emitting element being controlled to change into a first state responsive to the drive signal having the second signal intensity, respectively, the second state having an emission intensity lower than that of the first state.

4. The lighting unit of claim 3, wherein the controller controls the light-emitting elements to the first or second state at mutually different points of times.

5. The lighting unit of claim 3, wherein the second state is a zero-luminance state.

6. The lighting unit of claim 3, wherein the second state is a reduced-luminance state.

7. The lighting unit of claim 3, wherein the controller supplies drive signals, which have the first signal intensity for mutually different percentages of the one period thereof, to the at least two light-emitting elements, respectively.

8. The lighting unit of claim 3, wherein the controller supplies drive signals, having mutually different maximum signal intensities, to the at least two light-emitting elements, respectively.

9. The lighting unit of claim 2, wherein the at least one partition is elongated in a predetermined direction.

10. A liquid crystal display device comprising:
    liquid crystal panel that includes a pair of substrates and a liquid crystal layer sandwiched between the substrates; and
    the lighting unit of claim 9, which is provided behind the liquid crystal panel,
    wherein multiple gate lines are arranged substantially parallelly to each other on one of the two substrates, and
    wherein a direction in which the gate lines extend is substantially parallel to a direction in which the at least one partition extends.

* * * * *